United States Patent
Limberg

[19]

[11] Patent Number: 6,057,877
[45] Date of Patent: May 2, 2000

[54] NTSC INTERFERENCE DETECTORS USING PAIRS OF COMB FILTERS WITH ZERO-FREQUENCY RESPONSES, AS FOR DTV RECEIVERS

[75] Inventor: Allen LeRoy Limberg, Vienna, Va.

[73] Assignee: SamSung Electronics Co., Ltd., Suwon, Rep. of Korea

[21] Appl. No.: 09/151,208

[22] Filed: Sep. 11, 1998

Related U.S. Application Data

[60] Provisional application No. 60/135,099, Sep. 19, 1997, and provisional application No. 60/100,438, Sep. 25, 1997.

[51] Int. Cl.$^7$ ...................................................... H04N 5/38
[52] U.S. Cl. ........................... 348/21; 348/470; 348/725; 348/607
[58] Field of Search ................................ 348/21, 487, 470, 348/555, 725, 726, 607, 614; 375/346, 348, 380

[56] References Cited

U.S. PATENT DOCUMENTS

| | | | |
|---|---|---|---|
| 5,087,975 | 2/1992 | Citta et al. ................................ | 348/21 |
| 5,151,785 | 9/1992 | Citta ....................................... | 358/141 |
| 5,260,793 | 11/1993 | Citta et al. ............................... | 358/167 |
| 5,325,204 | 6/1994 | Scarpa ..................................... | 348/607 |
| 5,429,449 | 7/1995 | Patel ....................................... | 375/326 |
| 5,508,752 | 4/1996 | Kim et al. ................................ | 348/608 |
| 5,546,132 | 8/1996 | Kim et al. ................................ | 348/607 |
| 5,602,583 | 2/1997 | Citta ........................................ | 348/21 |
| 5,648,822 | 7/1997 | Hulyalkav ................................ | 348/21 |
| 5,715,012 | 2/1998 | Patel ....................................... | 348/558 |

*Primary Examiner*—Victor R. Kostak
*Attorney, Agent, or Firm*—Robert E. Bushnell, Esq.

[57] ABSTRACT

A first comb filter differentially combines an I- or Q-channel baseband signal supplied as input signal to a co-channel NTSC interference detector for a DTV receiver with that signal as subjected to a first amount of differential delay. This generates a first comb filter response in which artifacts arising from synchronous detection of the co-channel interfering analog television signal are suppressed. The detector includes a second comb filter that combines the input signal with that signal as subjected to a second amount of differential delay to generate a second comb filter response in which artifacts of the co-channel interference are reinforced. The first and second comb filters both use the same type of linear combiner so the direct term of input signal is treated similarly in the first comb filter response and in the second comb filter response. First and second amplitude detectors detect the respective amplitudes of these comb filter responses. An amplitude comparator compares the first and second amplitude detection responses and indicates, when and only when the first and second amplitude detection responses differ more than a prescribed amount, that co-channel interference is of sufficient strength to be objectionable.

28 Claims, 13 Drawing Sheets

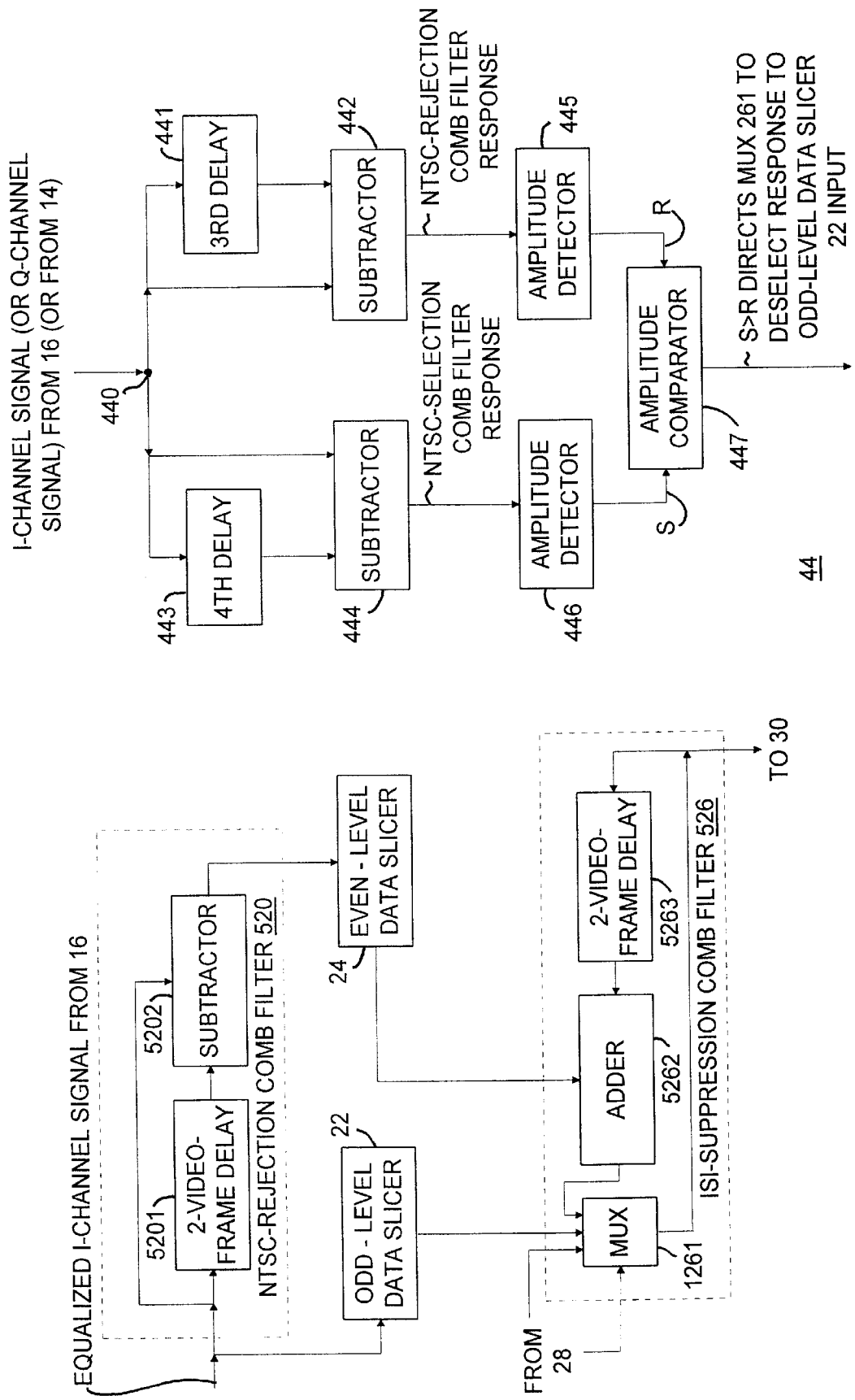

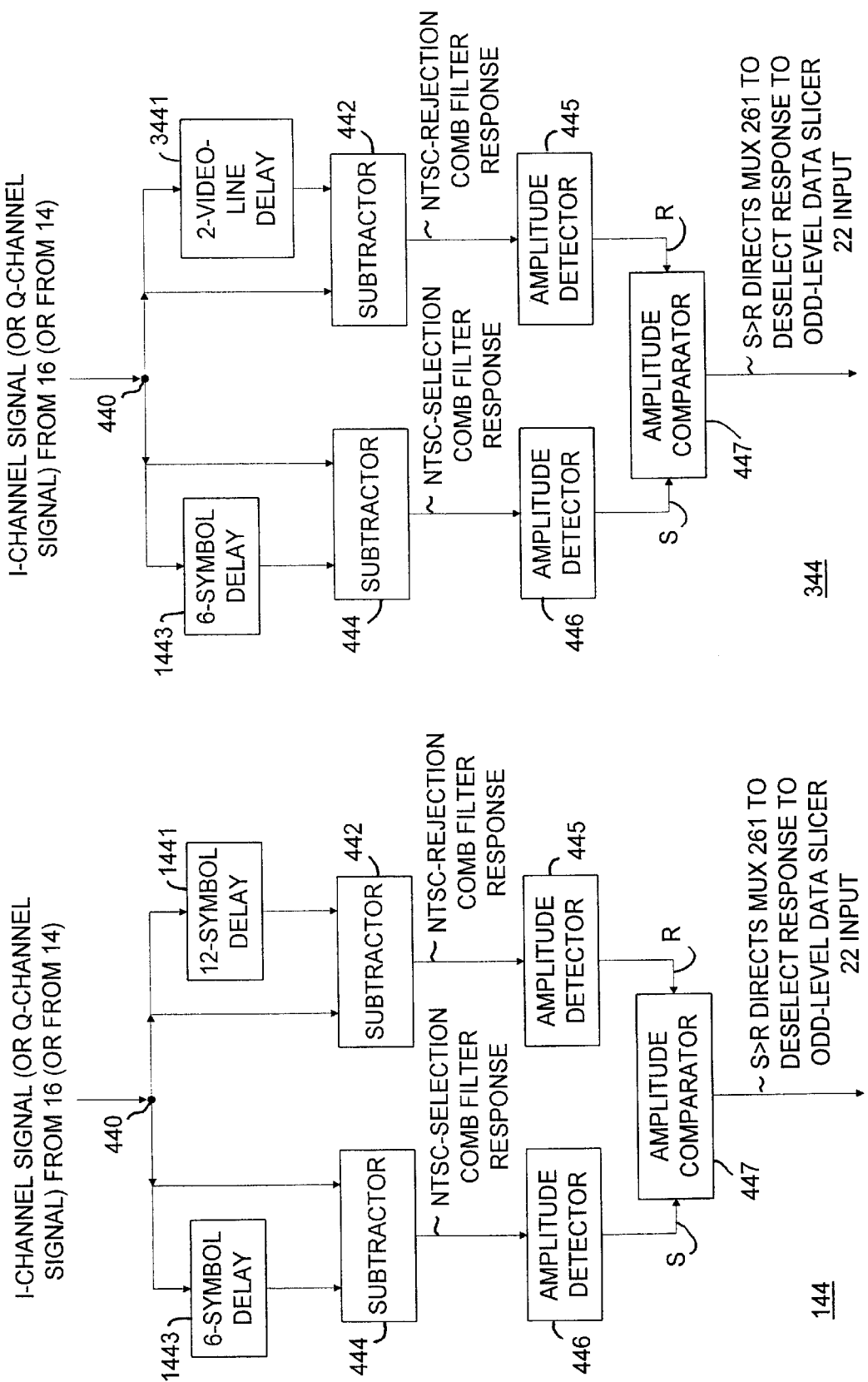

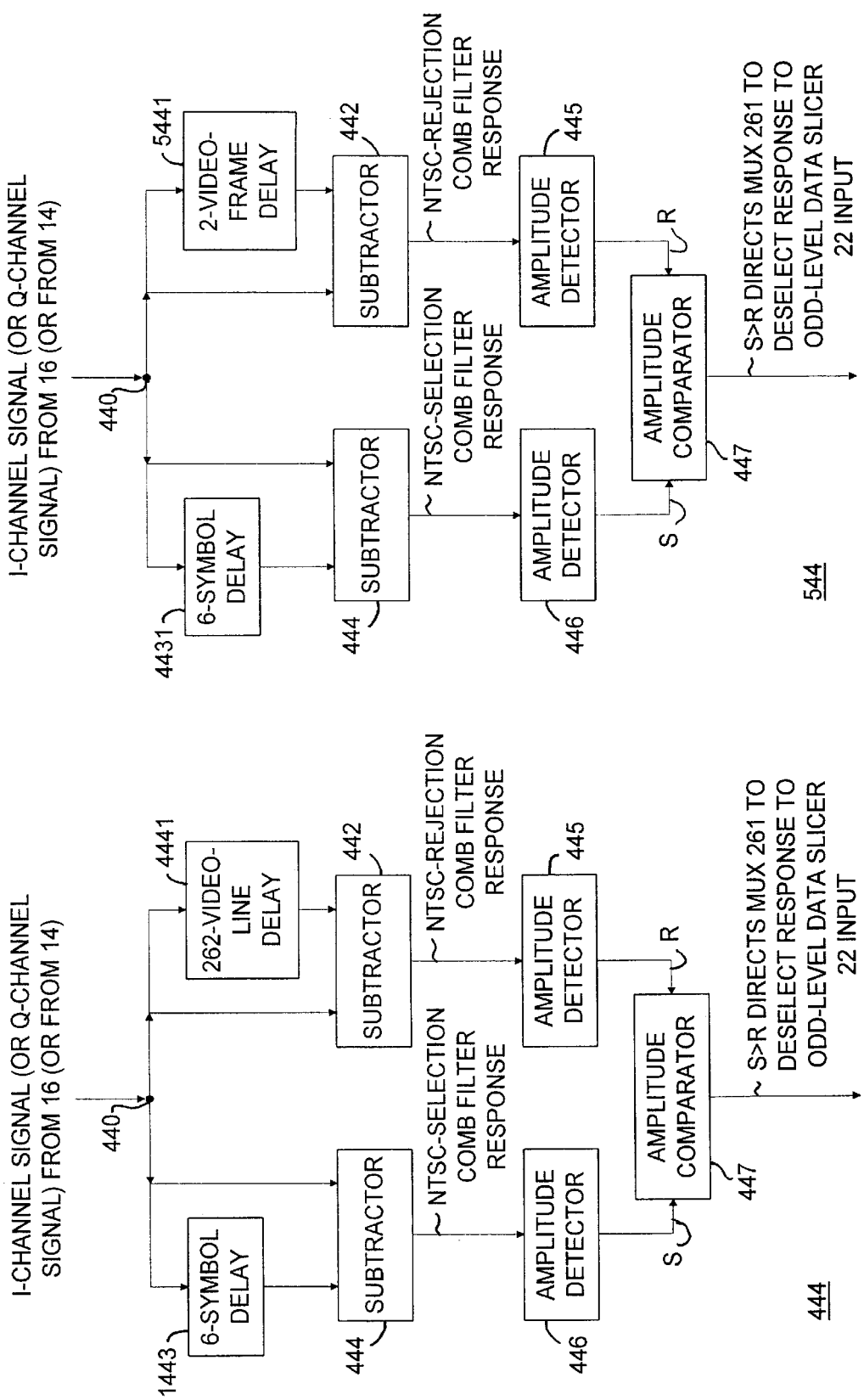

NTSC INTERFERENCE DETECTORS USING PAIRS OF COMB FILTERS WITH ZERO-FREQUENCY RESPONSES, AS FOR DTV RECEIVERS

This is a complete application filed under 35 U.S.C. 111(a) claiming, pursuant to 35 U.S.C. §119(e)(1), benefit of the filing dates of provisional U.S. patent application Ser. No. 60/135,099 filed Sep. 19, 1997, and of provisional U.S. patent application Ser. No. 60/100,438 filed Sep. 25, 1997, pursuant to 35 U.S.C. 111(b).

The present invention relates to digital television systems, and more particularly, to circuits employed in the digital television (DTV) receiver for determining whether or not there is co-channel interference from NTSC analog television signals.

BACKGROUND OF THE INVENTION

A Digital Television Standard published Sep. 16, 1995 by the Advanced Television Systems Committee (ATSC) specifies vestigial sideband (VSB) signals for transmitting digital television (DTV) signals in 6-MHz-bandwidth television channels. DTV signals will be transmitted in certain of the ultra-high-frequency transmission channels currently used in over-the-air broadcasting of National Television System Committee (NTSC) analog television signals within the United States. The VSB DTV signal is designed so its spectrum is likely to interleave with the spectrum of a co-channel interfering NTSC analog TV signal. The symbol frequency of the DTV signal is three times NTSC color subcarrier frequency, which 3.58 MHz subcarrier frequency is 455/2 times NTSC scan line rate. The pilot carrier and the principal amplitude-modulation sideband frequencies of the DTV signal are positioned at odd multiples of one-quarter the horizontal scan line rate of the NTSC analog TV signal. This causes these DTV signal components to fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal can be offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel.

The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which NTSC horizontal scan line rate is multiplied to obtain the 4.5 MHz sound carrier offset from video carrier in an NTSC analog TV signal. The symbol rate is 10.762238 million symbols per second, which can be contained in a VSB signal extending 5.381119 MHz from DTV signal carrier. That is, the VSB signal can be limited to a band extending 5.690997 MHz from the lower limit frequency of the television channel.

The ATSC standard for DTV signal terrestrial broadcasting in the United States of America is capable of transmitting either of two high-definition television (HDTV) formats with 16:9 aspect ratio. One HDTV display format uses 1920 samples per scan line and 1080 active horizontal scan lines per 30 Hz frame with 2:1 field interlace. The other HDTV display format uses 1280 luminance samples per scan line and 720 progressively scanned scan lines of television image per 60 Hz frame. The ATSC standard also accommodates the transmission of DTV display formats other than HDTV display formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. One may consider the data fields to be consecutively numbered modulo-2, with each odd-numbered data field and the succeeding even-numbered data field forming a data frame. The frame rate is 20.66 frames per second. Each data segment is of 77.3 microseconds duration. So, with the symbol rate being 10.76 MHz, there are 832 symbols per data segment. Each segment of data begins with a data-segment-synchronization (DSS) code group of four symbols having successive values of +S, −S, −S and +S. The value +S is one level below the maximum positive data excursion, and the value −S is one level above the maximum negative data excursion. The initial data segment of each data field includes a data-field-synchronization (DFS) code group that codes a training signal for channel-equalization and multipath suppression procedures. The training signal is a 511-sample pseudo-noise sequence (or "PN-sequence") followed by three 63-sample PN sequences. The middle ones of the 63-sample PN sequences in the DFS codes are transmitted in accordance with a first logic convention in the first line of each odd-numbered data field and in accordance with a second logic convention in the first line of each even-numbered data field. The first and second logic conventions are complementary to each other (i. e., of opposite senses of polarity).

The data within data segments are trellis coded using twelve interleaved trellis codes, each a ⅔ rate trellis code with one uncoded bit that is precoded. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission. The Reed-Solomon coding results are transmitted as 16-level (4 bits/symbol) one-dimensional-constellation symbol coding for cablecast, which transmissions are made without any preceding after symbol generation. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized value of 1.25. The normalized value of +S is +5, and the normalized value of −S is −5.

In the earlier development of the DVT art it was contemplated that the DTV broadcaster might be called upon to decide whether or not to use a symbol precoder at the transmitter. This symbol precoder would follow the symbol generation circuitry and, when used together with a comb filter in each DTV signal receiver, would provide for matched filtering of symbols. The comb filter would precede the data-slicer in the symbol decoder circuitry of the DTV signal receiver and would operate as a symbol post-coder. This decision would have depended upon whether interference from a co-channel NTSC broadcasting station were expected or not. Symbol precoding would not have been used for data-segment-synchronization code groups or during data segments in which data field synchronization data were transmitted. Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not obtain if there are no co-channel NTSC broadcasting stations, of course. If there were likelihood of NTSC interference within his area of broadcast coverage, it was presumed that the HDTV broadcaster would use the symbol precoder to facilitate the HDTV signal being more easily separated from NTSC interference. Accordingly, a comb filter would be employed as symbol post-coder in the DTV signal receiver to complete matched filtering. It was presumed that the DTV broadcaster would discontinue using the symbol precoder if there were little or no possibility of NTSC interference. Accordingly, the symbol post-coder in each DTV signal receiver would then be disabled, in order that flat spectrum noise would be less likely to cause erroneous decisions as to symbol values in the trellis decoder.

U.S. Pat. No. 5,260,793 issued Nov. 9, 1993 to R. W. Citta et alii and entitled "RECEIVER POST CODER SELECTION CIRCUIT" selectively employs a post-coder comb filter. The filter suppresses artifacts of co-channel NTSC interference accompanying a real or in-phase baseband component (I channel) of the complex output signal of a demodulator used in a DTV signal receiver. The presence of these artifacts in the I-channel component of the demodulator response is detected for developing control signals automatically to enable or disable the suppression of the artifacts of co-channel NTSC interference by comb filtering. During each data field sync interval, the input signal to and the output signal from an NTSC suppression filter of comb filter type in the DTV signal receiver are each compared with a respective signal that is known a priori and is drawn from memory within the HDTV signal receiver. If the minimum result of comparison with the input signal has less energy than the minimum result of comparison with the output signal from the NTSC suppression filter, this is indicative that the primary cause of variance from expected reception is random noise rather than co-channel NTSC interference. Insofar as the particular DTV signal receiver is concerned, reception would be better were precoding and post-coding not employed in the system, and it is presumed that the broadcaster has not employed preceding. If the minimum result of comparison with the input signal has more energy than the minimum result of comparison with the output signal from the NTSC suppression filter, this is indicative that artifacts of co-channel NTSC interference rather than random noise are the primary cause of variance from expected reception. Insofar as the particular DTV signal receiver is concerned, reception would be better were precoding and post-coding employed in the system, and it is presumed that the broadcaster has employed preceding.

U.S. Pat. No. 5,546,132 issued Aug. 13, 1996 to K. S. Kim et alii and entitled "NTSC INTERFERENCE DETECTOR" describes the use of post-coder comb filtering for suppressing artifacts of co-channel NTSC interference when the presence of such interference is detected in NTSC-extraction comb filter response to the I channel. U.S. Pat. No. 5,546,132 does not specifically describe an imaginary or quadrature-phase baseband component (Q channel) of a complex output signal being supplied from the demodulator used in a DTV signal receiver. A DTV signal receiver that synchrodynes the VSB AM signals to baseband commonly employs a demodulator that includes an in-phase synchronous detector for supplying received I-channel signal for trellis decoding (after post-coding, if precoding is used at the transmitter). This demodulator further includes a quadrature-phase synchronous detector for supplying received Q-channel signal which is lowpass filtered to generate an automatic frequency and phase control (AFPC) signal for the local oscillator supplying carrier for synchrodyning. The specification and drawing of U.S. Pat. No. 5,479,449 issued Dec. 26, 1996 to C. B. Patel and A. L. R. Limberg, entitled "DIGITAL VSB DETECTOR WITH BANDPASS PHASE TRACKER, AS FOR INCLUSION IN AN HDTV RECEIVER", and assigned to Samsung Electronics Co., Ltd., is incorporated herein by reference. The reader's attention is specifically directed to elements 22–27 in FIG. 1 of the drawing of U.S. Pat. No. 5,479,449 and the description thereof in the accompanying specification. These elements are used in the described DTV signal receiver for carrying out complex demodulation of the VSB AM final intermediate-frequency signal. U.S. Pat. No. 5,479,449 describes complex demodulation of the VSB AM final I-F signal being carried out in the digital regime, but in alternative DTV receiver designs complex demodulation of the VSB AM final I-F signal is instead carried out in the analog regime.

In both U.S. Pat. Nos. 5,260,793 and 5,546,132 post-coding is enabled during times of substantial co-channel NTSC interference and otherwise disabled, with the control signal for such selective enablement being developed from the received I-channel signal. The determination of co-channel NTSC interference levels is complicated by the direct bias accompanying the co-channel NTSC interference. The direct bias arises from the in-phase synchronous detection of the pilot carrier of the VSB AM DTV signal. This is particularly a problem in DTV signal receivers in which automatic gain control does not tightly regulate the amplitude of the received I-channel signal recovered by in-phase synchronous detection.

The video carrier of an NTSC signal is 1.25 MHz from edge of the 6-MHz-wide broadcast channel, while the carrier for a DTV signal for terrestrial through-the-air broadcast is 310 kHz from edge of the 6-MHz-wide broadcast channel. A co-channel NTSC signal does not exhibit symmetrical amplitude-modulation sidebands with respect to the carrier of the vestigial-sideband amplitude modulation (VSB AM) carrying digital information. Accordingly, artifacts of the NTSC video carrier at 940 kHz remove from DTV signal carrier and artifacts of its sidebands are not well canceled in the DTV signal as synchrodyned to baseband. Nor, of course, are artifacts of the NTSC audio carrier and its sidebands, the NTSC audio carrier being at 5.44 MHz remove from DTV signal carrier.

The Digital Television Standard the ATSC published Sep. 16, 1995 does not allow for the use of precoding of complete data symbols at the DTV transmitter to compensate for post-coding incidental to subsequent use of comb filtering in a DTV signal receiver to reject co-channel NTSC interference. Instead, only the initial bit in each symbol is precoded.

This procedure by itself does not facilitate a DTV signal receiver using comb filtering to reject co-channel NTSC interference before data slicing procedures are undertaken. A DTV signal receiver that does not reject artifacts of co-channel NTSC interference before data slicing procedures are undertaken will not have good reception under strong co-channel NTSC interference conditions. Such conditions may be caused by the DTV signal receiver being remote from the DTV transmitter or having a close-by analog TV transmitter. In the DTV signal as synchrodyned to baseband the artifacts of the video carrier of a co-channel interfering NTSC color TV signal are at $59.75f_H$, $f_H$ being the horizontal scan frequency of that signal. The artifact of the color subcarrier is at $287.25f_H$, and the artifact of the unmodulated NTSC audio carrier is at $345.75f_H$.

Comb filtering procedures are not entirely satisfactory for suppressing artifacts of the frequency-modulated NTSC audio carrier, particularly under conditions of frequency modulation in which carrier frequency deviation is large, the inventor points out. This is because correlation (or anticorrelation) of samples of the FM carrier at times separated by any substantial fixed delay may not be particularly good. U.S. Pat. No. 5,748,226 entitled "DTV RECEIVER WITH FILTER IN I-F CIRCUITRY TO SUPPRESS FM SOUND CARRIER OF CO-CHANNEL NTSC INTERFERING SIGNAL" issued to the inventor on May 5, 1998 is incorporated herein by reference. In U.S. Pat. No. 5,748,226 the inventor recommends that the filtering used to establish the overall bandwidth of intermediate-frequency amplification be such as to reject the FM audio carrier of any co-channel interfering NTSC analog TV signal.

Comb filtering procedures are more satisfactory for separating the baseband DTV signal from other artifacts of the co-channel NTSC signal arising from the video carrier, the low video frequencies, and the chrominance signal frequencies close to the color carrier. This is because these artifacts tend to exhibit good correlation between samples separated by certain specific delay intervals and good anti-correlation between samples separated by certain other specific delay intervals.

In U.S. Pat. No. 5,748,226 the inventor advocates preceding data-slicing in a DTV signal receiver with comb filtering to suppress co-channel NTSC interference when it is large enough to affect data-slicing adversely. The inventor teaches how to compensate in the symbol decoding procedure for the effects of such comb filtering upon symbol coding when it is selectively done. It is still useful, then, to be able to determine when co-channel NTSC interference is larger than a prescribed value denominated as being acceptably small, so that this determination can be used for controlling the selective use of comb filtering to suppress co-channel NTSC interference.

Co-channel NTSC interference will appear in the imaginary or quadrature-phase baseband component (Q channel) of the complex output signal of a demodulator used in a DTV signal receiver whenever co-channel NTSC interference appears in the real or in-phase baseband component (I channel) of that complex output signal. Accordingly, an NTSC interference detector can be arranged so that its NTSC extracting filter responds to the received Q-channel signal, rather than the received I-channel signal. The amount of co-channel NTSC interference is significant if it causes too many errors in the trellis decoding of equalized received I-channel signal to be corrected by the Reed-Solomon decoder following the trellis decoder. By determining whether or not a significant amount of co-channel NTSC interference accompanies the received Q-channel signal, it is inferentially determined whether or not a significant amount of co-channel NTSC interference accompanies the received I-channel signal. The accurate determination of co-channel NTSC interference levels tends to be simpler, because essentially no direct bias arises from the quadrature-phase synchronous detection of the pilot carrier of the VSB AM DTV signal after the synchronous detection apparatus has achieved phase-lock with the pilot carrier.

A co-channel NTSC interference detector that is insensitive to direct bias arising from synchronous detection of the pilot carrier was an objective of the inventor when developing apparatus disclosed in this specification. Such a co-channel NTSC interference detector permits direct determination of whether or not a significant amount of co-channel NTSC interference accompanies the received I-channel signal without need for an equalization filter that suppresses direct bias arising from synchronous detection of the pilot carrier. Such an equalization filter is more difficult to implement than an equalization filter that has response at zero frequency. Also, an equalization filter without response at zero-frequency can interfere with automatic-gain-control (AGC) and automatic-frequency-and-phase-control (AFPC) loops in certain DTV signal receiver designs. In a DTV signal receiver that responds to the received Q-channel signal to determine whether or not co-channel NTSC interference is significant, a co-channel NTSC interference detector that is insensitive to direct bias arising from synchronous detection of the pilot carrier is still useful. Such co-channel NTSC interference detector provides for continuity in the initial adjustment of DTV signal receiver equalization.

SUMMARY OF THE INVENTION

The invention is embodied in a digital television (DTV) signal receiver for digital television signals that are received as vestigial-sideband amplitude-modulation of a carrier and that are apt to be accompanied at times by co-channel interfering analog television signals of undesirable strengths. In accordance with the invention the DTV signal receiver includes a particular type of co-channel interference detector that is insensitive to the direct term of the system function of the circuitry preceding it. The DTV signal receiver includes amplifier circuitry for supplying an amplified vestigial-sideband amplitude-modulated digital television signal and demodulation circuitry responsive to the amplified vestigial-sideband amplitude-modulated DTV signal for supplying at least one baseband signal, which one baseband signal is supplied to the co-channel interference detector as its input signal. The at least one baseband signal includes an I-channel baseband signal containing artifacts of any co-channel interfering analog television signal, supplied to symbol decoding apparatus included in the DTV signal receiver. The symbol decoding apparatus includes a selectively operable filter for suppressing any artifacts of co-channel interfering analog television signal accompanying the I-channel baseband signal to be symbol decoded. This filter is operable when and only when the symbol decoding apparatus receives a signal indicating that there is a significant amount of co-channel NTSC interference. Error correction circuitry included in the DTV signal receiver is connected for correcting errors in symbol decoding results supplied thereto from the symbol decoding apparatus. The co-channel interference detector is of the following construction. A first comb filter differentially combines the one baseband signal supplied as input signal to the co-channel interference detector with that one baseband signal as subjected to a first amount of differential delay, to generate a first comb filter response. In this first comb filter response a direct term of system characteristic arising from synchronous detection of the carrier is suppressed, and artifacts arising from synchronous detection of the co-channel interfering analog television signal are suppressed. A second comb filter differentially combines the one baseband signal supplied as input signal to the co-channel interference detector with that one baseband signal as subjected to a second amount of differential delay to generate a second comb filter response. In this second comb filter response the direct term of system characteristic arising from synchronous detection of said carrier is suppressed, and artifacts arising from synchronous detection of the co-channel interfering analog television signal are reinforced. A first amplitude detector detects the amplitude of the first comb filter response to generate a first amplitude detection response, and a second amplitude detector detects the amplitude of the second comb filter response to generate a second amplitude detection response. An amplitude comparator compares the first and second amplitude detection responses. The amplitude comparator supplies the signal indicating there is said significant amount of co-channel NTSC interference when, and only when, the first and second amplitude detection responses differ by more than a prescribed amount.

BRIEF DESCRIPTION OF THE DRAWING

FIG. 9 is a block schematic diagram that shows details of a portion of the DTV signal receiver of FIG. 1 or FIG. 3 when the NTSC-rejection comb filter employs a 2-video-frame (718,200-symbol) delay.

FIG. 10 is a block diagram of the general form taken by a co-channel NTSC interference detector constructed in accordance with the invention. The input signal of the detector is differentially combined with itself as subjected to 6-symbol differential delay in a comb filter used for extracting artifacts of co-channel NTSC interference that are unaccompanied by DTV pilot carrier signal.

FIG. 11 is a block schematic diagram of a species of the FIG. 10 co-channel NTSC interference detector the input signal of which is differentially combined with itself as subjected to 12-symbol differential delay in a comb filter used for suppressing artifacts of co-channel NTSC interference.

FIG. 12 is a block schematic diagram of a species of the FIG. 10 co-channel NTSC interference detector the input signal of which is differentially combined with itself as subjected to 2-video-line or 1368-symbol differential delay in a comb filter used for suppressing artifacts of co-channel NTSC interference.

FIG. 13 is a block schematic diagram of a species of the FIG. 10 co-channel NTSC interference detector the input signal of which is differentially combined with itself as subjected to 262-video-line or 179,208-symbol differential delay in a comb filter used for suppressing artifacts of co-channel NTSC interference.

FIG. 14 is a block schematic diagram of a species of the FIG. 10 co-channel NTSC interference detector the input signal of which is differentially combined with itself as subjected to 2-video-frame or 718,200-symbol differential delay in a comb filter used for suppressing artifacts of co-channel NTSC interference.

Figure 18:
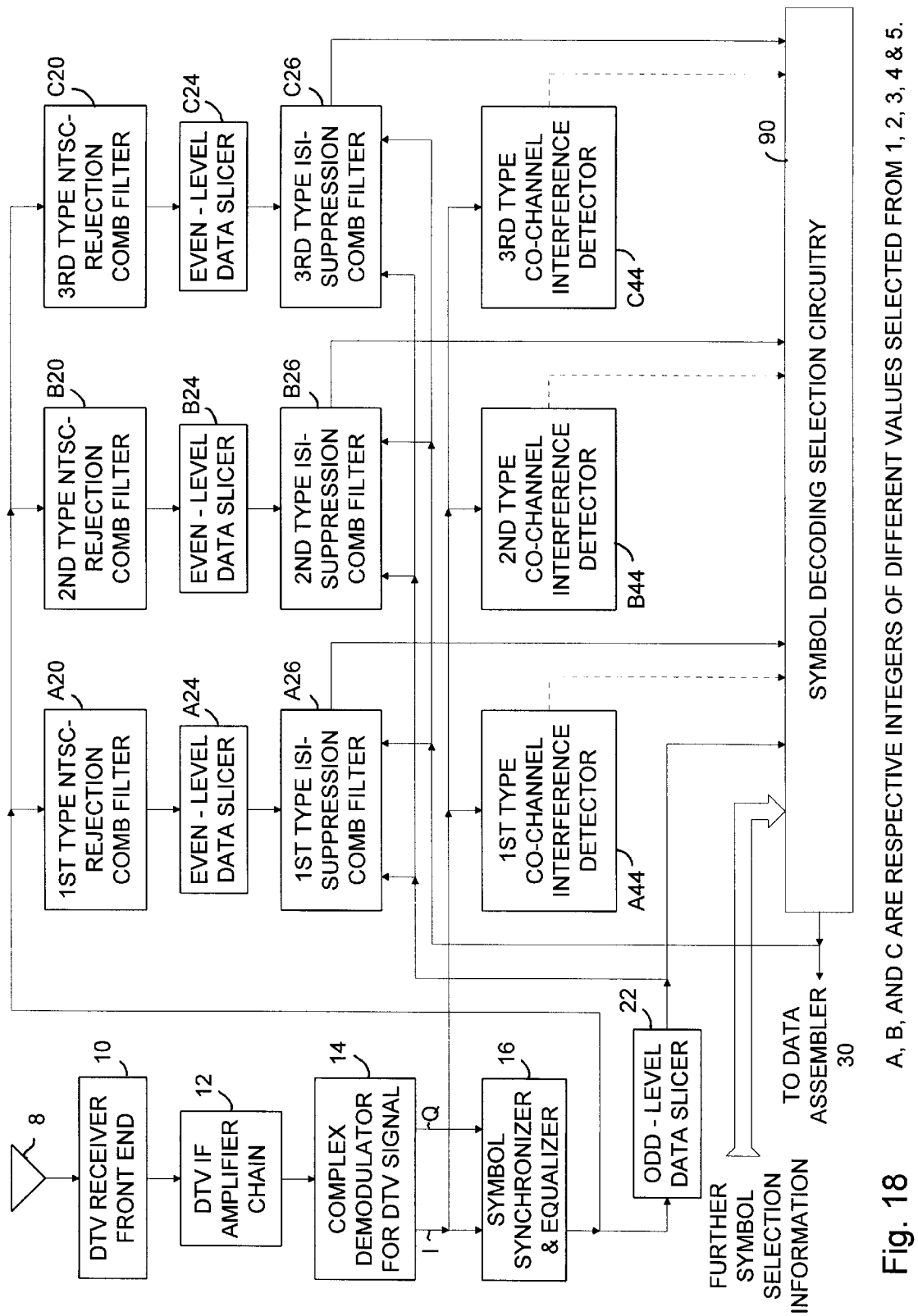
Figure 19:
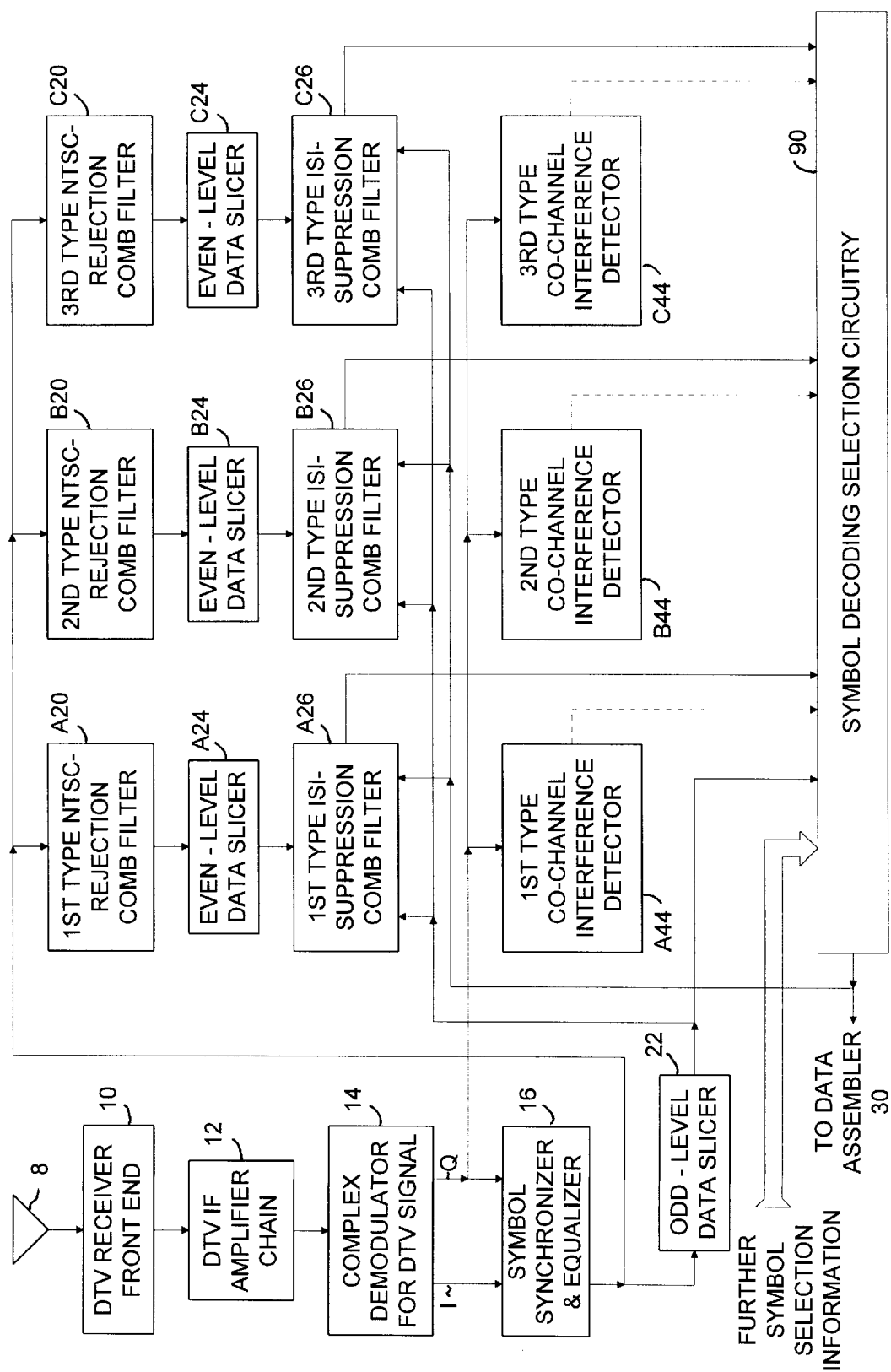

Each of FIGS. 18 and 19 is a block schematic diagram of a digital television receiver embodying the invention, in which DTV signal receiver a plurality of comb filters and associated co-channel NTSC interference detectors are employed for selectively filtering against artifacts of co-channel NTSC interference.

DETAILED DESCRIPTION OF THE PREFERRED EMBODIMENTS

At various points in the circuits shown in the FIGURES of the drawing, shimming delays have to be inserted in order that the sequence of operation is correct, as will be understood by those skilled in electronic design. Unless there is something out of the ordinary about a particular shimming delay requirement, it will not be explicitly referred to in the specification that follows.

Figure 1:
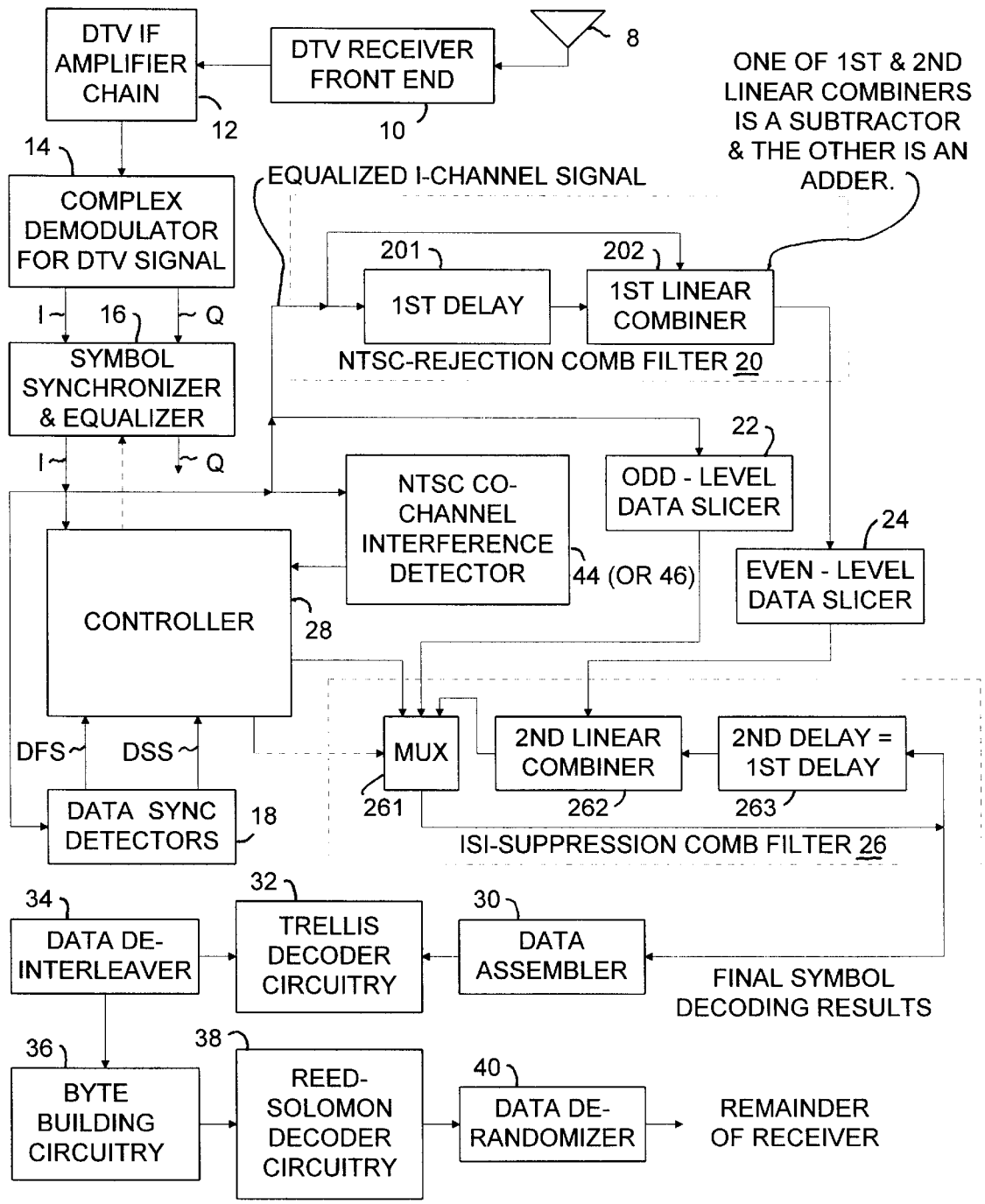
FIG. 1 is a block diagram of a portion of a DTV signal receiver that includes a symbol decoder with co-channel NTSC interference suppression circuitry selectively activated in accordance with an aspect of the invention. The selective activation depends on the response of a co-channel NTSC interference detector that includes a comb filter for extracting NTSC artifacts from baseband I-channel signals and suppressing DTV pilot carrier accompanying those artifacts.

FIG. 1 shows a digital television signal receiver used for recovering error-corrected data, which data are suitable for recording by a digital video cassette recorder (DVCR) or for MPEG-2 decoding and display in a television set. The FIG. 1 DTV signal receiver is shown as receiving television broadcast signals from a receiving antenna 8, but can receive the signals from a cable network instead. The television broadcast signals are supplied as input signal to "front end" electronics 10. The "front end" electronics 10 generally include a radio-frequency amplifier and first detector for converting radio-frequency television signals to intermediate-frequency television signals, supplied as input signal to an intermediate-frequency (IF) amplifier chain 12 for vestigial-sideband DTV signals. The DTV signal receiver is preferably of plural-conversion type with the IF amplifier chain 12 including an IF amplifier for amplifying DTV signals as converted to an ultra-high-frequency band by the first detector, a second detector for converting the amplified DTV signals to a very-high-frequency band, and a further IF amplifier for amplifying DTV signals as converted to the VHF band. If demodulation to baseband is performed in the digital regime, the IF amplifier chain 12 will further include a third detector for converting the amplified DTV signals to a final intermediate-frequency band closer to baseband.

Preferably, a surface-acoustic-wave (SAW) filter is used in the IF amplifier for the UHF band, to shape channel selection response and reject adjacent channels. This SAW filter cuts off rapidly just beyond 5.38 MHz remove from the suppressed carrier frequency of the VSB DTV signal and the pilot carrier, which is of like frequency and of fixed amplitude. This SAW filter accordingly rejects much of the frequency-modulated sound carrier of any co-channel interfering analog TV signal. Removing the FM sound carrier of any co-channel interfering analog TV signal in the IF amplifier chain 12 prevents artifacts of that carrier being generated when the final I-F signal is detected to recover baseband symbols and forestalls such artifacts interfering with data-slicing of those baseband symbols during symbol decoding. The prevention of such artifacts interfering with data-slicing of those baseband symbols during symbol decoding is better than can be accomplished by relying on comb-filtering before data-slicing, particularly if the differential delay in the comb filter is more than a few symbol epochs.

The final IF output signals from the IF amplifier chain 12 are supplied to a complex demodulator 14, which demodulates the vestigial-sideband amplitude-modulation DTV signal in the final intermediate-frequency band to recover a real baseband signal and an imaginary baseband signal. Demodulation may be done in the digital regime after analog-to-digital conversion of a final intermediate-frequency band in the few-megahertz range as described in U.S. Pat. No. 5,479,449, for example. Alternatively, demodulation may be done in the analog regime, in which case the results are usually subjected to analog-to-digital conversion to facilitate further processing. The complex demodulation is preferably done by in-phase (I) synchronous demodulation and quadrature-phase (Q) synchronous demodulation. The digital results of the foregoing demodulation procedures conventionally have 8-bit accuracy or more and describe 2N-level symbols that encode N bits of data. Currently, 2N is eight in the case where the FIG. 1 DTV signal receiver receives a through-the-air broadcast via the antenna 12 and is sixteen in the case where the FIG. 1 DTV signal receiver receives cablecast. The concern of the invention is with the reception of terrestrial through-the-air broadcasts, and FIG. 1 does not show the portions of the DTV signal receiver providing symbol decoding and error-correction decoding for received cablecast transmissions.

Symbol synchronization and equalization circuitry 16 receives at least the digitized real samples of the in-phase (I-channel) baseband signal from the complex demodulator 14; in the FIG. 1 DTV signal receiver the circuitry 16 is shown also receiving the digitized imaginary samples of the quadrature-phase (Q-channel) baseband signal. The circuitry 16 includes a digital filter with adjustable weighting coefficients that compensates for ghosts and tilt in the received signal. The symbol synchronization and equalization circuitry 16 provides symbol synchronization or "de-rotation" as well as amplitude equalization and ghost removal. Symbol synchronization and equalization circuitry in which symbol synchronization is accomplished before amplitude equalization is known from U.S. Pat. No. 5,479,449. In such designs the demodulator 14 will supply over-sampled demodulator response containing real and imaginary baseband signals to the symbol synchronization and equalization circuitry 16. After symbol synchronization, the over-sampled data are decimated to extract baseband I-channel signal at normal symbol rate, to reduce sample rate through the digital filtering used for amplitude equalization and ghost removal. Symbol synchronization and equalization circuitry in which amplitude equalization precedes symbol synchronization, "de-rotation" or "phase tracking" is also known to those skilled in the art of digital signal receiver design.

Each sample of the circuitry 16 output signal is resolved to ten or more bits and is, in effect, a digital description of an analog symbol exhibiting one of (2N=8) levels. The circuitry 16 output signal is carefully gain-controlled by any one of several known methods, so the ideal step levels for symbols are known. One method of gain control, preferred because the speed of response of such gain control is exceptionally rapid, regulates the direct component of the real baseband signal supplied from the complex demodulator 14 to a normalized level of +1.25. This method of gain control is generally described in U.S. Pat. No. 5,479,449. This method is more specifically described by C. B. Patel el alii in U.S. Pat. No. 5,573,454 issued Jun. 3, 1997, entitled "AUTOMATIC GAIN CONTROL OF RADIO RECEIVER FOR RECEIVING DIGITAL HIGH-DEFINITION TELEVISION SIGNALS", and incorporated herein by reference.

The output signal from the circuitry 16 is supplied as input signal to data sync detection circuitry 18, which recovers data-field-synchronization information DFS and data-segment-synchronization information DSS from the equalized baseband I-channel signal. Alternatively, the input signal to data sync detection circuitry 18 can be obtained prior to equalization.

The equalized I-channel signal samples at normal symbol rate supplied as output signal from the circuitry 16 are applied as the input signal to an NTSC-rejection comb filter 20. The comb filter 20 includes a first delay device 201 to generate a pair of differentially delayed streams of the 2N-level symbols and a first linear combiner 202 for linearly combining the differentially delayed symbol streams to generate the comb filter 20 response. As described in U.S. Pat. No. 5,260,793, the first delay device 201 can provide a delay equal to the period of twelve 2N-level symbols, and the first linear combiner 202 can be a subtractor. Each sample of the comb filter 20 output signal is resolved to ten or more bits and is, in effect, a digital description of an analog symbol exhibiting one of (4N−1)=15 levels.

The symbol synchronization and equalization circuitry 16 is presumed be designed to suppress the direct bias component of its input signal (i.e., the direct term of the system function as expressed in digital samples). Each sample of the circuitry 16 output signal applied as comb filter 20 input signal would then be a digital description of an analog symbol exhibiting one of the following normalized levels: −7, −5, −3, −1, +1, +3, +5 and +7. These symbol levels are denominated as "odd" symbol levels and are detected by an odd-level data-slicer 22 to generate interim symbol decoding results of 000, 001, 010, 011, 100, 101, 110 and 111, respectively.

Each sample of the comb filter 20 output signal is, in effect, a digital description of an analog symbol exhibiting one of the following normalized levels: −14, −12, −10, −8, −6, −4, −2, 0, +2, +4, +6, +8, +10, +12 and +14. These symbol levels are denominated as "even" symbol levels and are detected by an even-level data-slicer 24 to generate comb-filtered symbol decoding results of 001, 010, 011, 100, 101, 110, 111, 000, 001, 010, 011, 100, 101, 110, and 111, respectively.

The data-slicers 22 and 24 can be of the so-called "hard decision" type, as presumed up to this point in the description, or can be of the so-called "soft decision" type used in implementing a Viterbi decoding scheme. Arrangements are possible in which the odd-level data-slicer 22 and the even-level data-slicer 24 are replaced by a single data-slicer, using multiplexer connections to shift its place in circuit and to provide bias to modify its slicing ranges, but these arrangements are not preferred because of the complexity of operation.

The symbol synchronization and equalization circuitry 16 is presumed in the foregoing description to be designed to suppress the direct bias component of its input signal (i.e., the direct term of the system function as expressed in digital samples). This direct bias component has a normalized level of +1.25 and appears in the real baseband signal supplied from the complex demodulator 14 owing to detection of the pilot carrier. In actuality the symbol synchronization and equalization circuitry 16 is designed to preserve the direct bias component of its input signal, at least partially, which simplifies the equalization filter in the circuitry 16 somewhat. Accordingly, the data-slicing levels in the odd-level data-slicer 22 are offset to take into account the direct bias component accompanying the data steps in its input signal. Providing that the first linear combiner 202 is a subtractor, whether the circuitry 16 is designed to suppress or to preserve the direct term of the system function of its input signal has no consequence in regard to the data-slicing levels in the even-level data-slicer 24. However, suppose the differential delay provided by the first delay device 201 is chosen so that the first linear combiner 202 is instead an adder. Then, the data-slicing levels in the even-level data-slicer 24 should be offset to take into account the doubled direct term that accompanies the data steps in its input signal.

An intersymbol-interference suppression comb filter 26 is used after the data-slicers 22 and 24 to generate a filter response in which the intersymbol interference (ISI) introduced by the comb filter 20 is suppressed. The ISI-suppression comb filter 26 includes a 3-input multiplexer 261, a second linear combiner 262, and a second delay device 263 with delay equal to that of the first delay device 201 in the NTSC-rejection comb filter 20. The second linear combiner 262 is a modulo-8 adder if the first linear combiner 202 is a subtractor and is a modulo-8 subtractor if the first linear combiner 202 is an adder. The first linear combiner 202 and the second linear combiner 262 may be constructed as respective read-only memories (ROMs) to speed up linear combination operations sufficiently to support the sample rates involved. The output signal from the multiplexer 261 furnishes the response from the ISI-suppression comb filter 26 and is delayed by the second delay device 263. The second linear combiner 262 combines precoded symbol decoding results from the even-level data-slicer 24 with the output signal from the second delay device 263.

The output signal of the multiplexer 261 reproduces one of the three input signals applied to the multiplexer 261, as selected in response to first, second and third states of a multiplexer control signal supplied to the multiplexer 261 from a controller 28. The first input port of the multiplexer 261 receives ideal symbol decoding results supplied from memory within the controller 28 during times when data-field-synchronization information DFS and data-segment-synchronization information DSS are recovered from the equalized baseband I-channel signal by the data sync detection circuitry 18. The controller 28 supplies the first state of the multiplexer control signal to the multiplexer 261 during these times, conditioning the multiplexer 261 to furnish, as the final coding results which are its output signal, the ideal symbol decoding results supplied from memory within the controller 28. The odd-level data-slicer 22 supplies interim symbol decoding results as its output signal to the second input port of the multiplexer 261. The multiplexer 261 is conditioned by the second state of the multiplexer control signal to reproduce the interim symbol decoding results in the final coding results supplied from the multiplexer 261. The second linear combiner 262 supplies ISI-suppression-filtered symbol decoding results as its output signal to the third input port of the multiplexer 261. The multiplexer 261 is conditioned by the third state of the multiplexer control signal to reproduce the ISI-suppression-filtered symbol decoding results in the final coding results supplied from the multiplexer 261. Running errors in the ISI-suppression-filtered symbol decoding results from the ISI-suppression comb filter 26 are curtailed by feeding back the ideal symbol decoding results supplied from memory within the controller 28 during times data sync detection circuitry 18 recovers DSS or DFS synchronization information.

The output signal from the multiplexer 261 in the ISI-suppression comb filter 26 comprises the final symbol decoding results in 3-parallel-bit groups, assembled by a data assembler 30 for application to trellis decoder circuitry 32. Trellis decoder circuitry 32 conventionally uses twelve trellis decoders. The trellis decoding results are supplied from the trellis decoder circuitry 32 to data de-interleaver circuitry 34 for de-commutation. Byte parsing circuitry 36 converts the data de-interleaver circuitry 34 output signal into bytes of Reed-Solomon error-correction-coded data for application to Reed-Solomon decoder circuitry 38, which performs Reed-Solomon decoding to generate an error-corrected byte stream supplied to a data de-randomizer 40. The data de-randomizer 40 supplies reproduced data to the remainder of the receiver (not shown). The remainder of a complete DTV signal receiver will include a packet sorter, an audio decoder, an MPEG-2 decoder and so forth. The remainder of a DTV signal receiver incorporated in a digital tape recorder/reproducer will include circuitry for converting the data to a form for recording.

A co-channel NTSC interference detector 44 that is insensitive to the direct bias component of its input signal is used for detecting the strength of the artifacts arising from co-channel NTSC interference in that input signal. The detector 44 input signal is the baseband I-channel signal in the FIG. 1 DTV signal receiver. The co-channel NTSC interference detector 44 supplies the controller 28 with an indication of whether co-channel NTSC interference is of sufficient strength as to cause uncorrectable error in the data-slicing performed by the data-slicer 22. If detector 44 indicates the co-channel NTSC interference is not of such strength, the controller 28 will supply the second state of multiplexer control signal to the multiplexer 261 most of the time. The only times this is not the case are those times when data-field-synchronization information DFS or data-segment-synchronization information DSS is recovered by the data sync detection circuitry 18, causing the controller 28 to apply the first state of multiplexer control signal to the multiplexer 261. The multiplexer 261 is conditioned by the second state of its multiplexer control signal to reproduce as its output signal the interim symbol decoding results supplied from the odd-level data-slicer 22.

If detector 44 indicates the co-channel NTSC interference is of sufficient strength to cause uncorrectable error in the data-slicing performed by the data-slicer 22, the controller 28 will supply the third state of multiplexer control signal to the multiplexer 261 most of the time. The only times this is not the case are those times when data-field-synchronization information DFS or data-segment-synchronization information DSS is recovered by the data sync detection circuitry 18, causing the controller 28 to apply the first state of multiplexer control signal to the multiplexer 261. The multiplexer 261 is conditioned by the third state of its multiplexer control signal to reproduce as its output signal the ISI-suppression-filtered symbol decoding results provided as second linear combining results from the second linear combiner 262.

Figure 2:
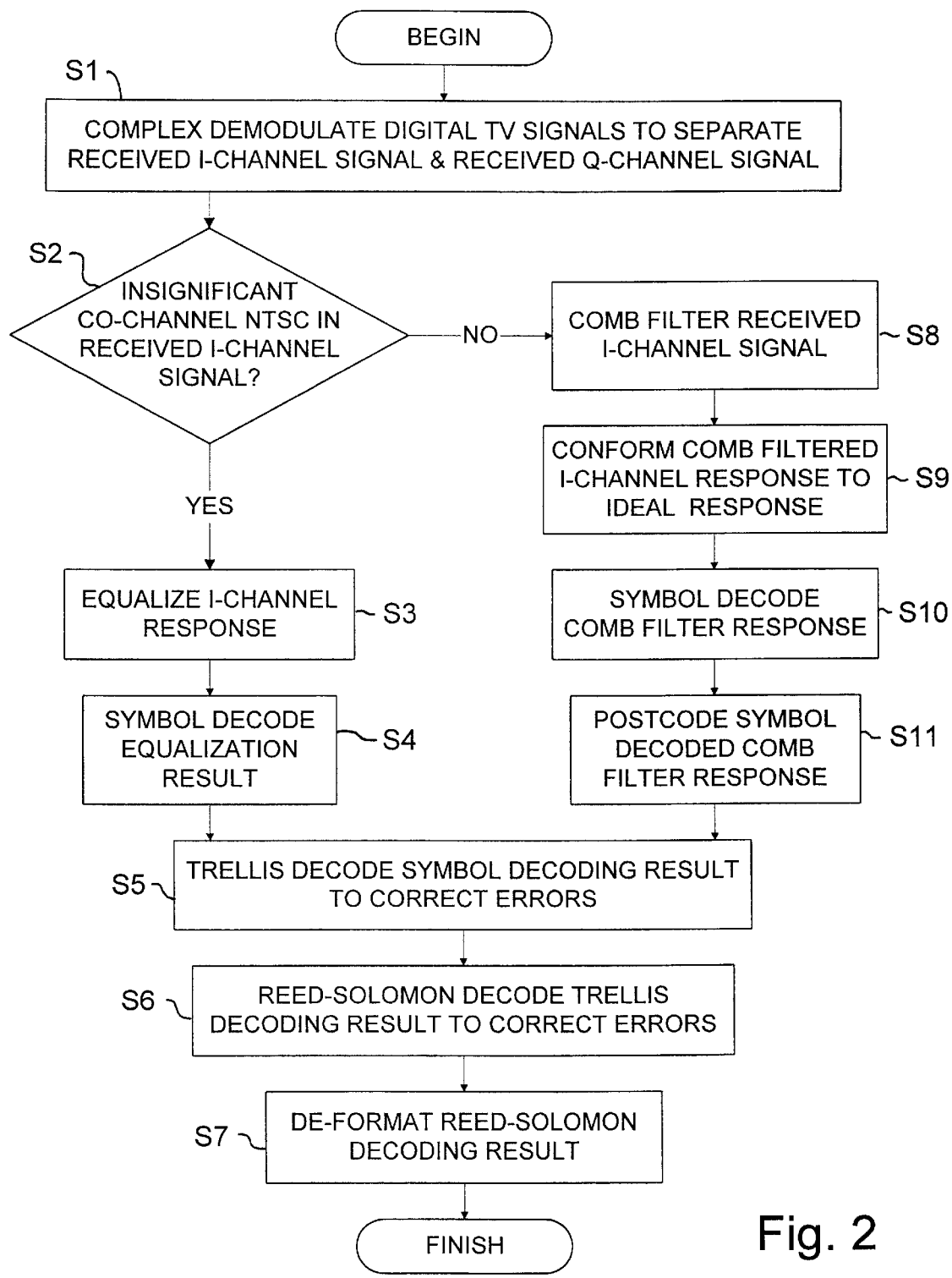
FIG. 2 is a flow chart of operation in a portion of the FIG. 1 digital television receiver showing how equalization procedures are modified depending on whether or not comb filtering to suppress co-channel NTSC interference is employed.

FIG. 2 is a flow chart showing how equalization procedures are modified in the FIG. 1 DTV signal receiver depending on whether or not comb filtering to suppress co-channel NTSC interference is employed. The inventor points out that the presence of the artifacts of co-channel NTSC interference in the baseband symbol coding introduces errors into the calculation of equalization filter kernel coefficients unless special measures are taken in the calculations to negate these artifacts.

In an initial step S1, a complex demodulation of digital television signals is continuously performed by the complex demodulator 14 in the FIG. 1 DTV signal receiver, to separate a received I-channel baseband signal and a received Q-channel baseband signal in an orthogonal relationship with the received I-channel baseband signal. In a decision step S2, which is also continuously performed by the NTSC co-channel interference detector 44 in the FIG. 1 DTV signal receiver, it is determined whether or not a significant amount of co-channel NTSC interference accompanies the received I-channel baseband signal.

A significant amount of co-channel NTSC interference in a DTV signal receiver is that level which causes the number of errors incurred during trellis decoding to significantly exceed the error correcting capabilities of the two-dimensional Reed-Solomon decoding that follows trellis decoding. A substantial number of bit errors in the ultimately recovered data occur, under reception conditions in which there is normal background noise. The significant amount of co-channel NTSC interference in a DTV signal receiver of particular design is readily determined by experiments on a prototype thereof.

If in the decision step S2 no significant amount of co-channel NTSC interference is determined to accompany the received I-channel baseband signal, a step S3 of adjusting the kernel weights of a digital equalization filter and a subsequent step S4 of symbol decoding the equalization filter response resulting from the step S3 are performed. The step S3 of adjusting the kernel weights is done so the digital equalization filter provides matched response to the I-channel baseband signal. The step S4 of symbol decoding the equalization filter response generates a symbol decoding result used in a subsequent step S5 of trellis decoding the symbol decoding result to correct errors therein. The step S5 of trellis decoding is followed by a step S6 of Reed-Solomon decoding to correct errors in the result of trellis decoding and a step S7 of deformatting the result of Reed-Solomon decoding.

If in the decision step S2 a significant amount of co-channel NTSC interference is determined to accompany the received I-channel baseband signal, a step S8 of comb filtering the received I-channel baseband signal to generate comb-filtered I-channel baseband signal is performed using a suitable comb filter. In a step S9 the kernel weights of the digital equalization filter are adjusted to conform the response of the cascaded digital equalization filter and comb filter to an ideal response for such filter cascade. A step S10 of symbol decoding the response of such filter cascade is performed and thereafter a step 11 of postcoding the symbol decoding response is performed to obtain corrected symbol decoding result to be used in the step S5 of trellis decoding. The postcoding in step 11 compensates for preceding that results from the comb filtering of step S8 and suppresses the intersymbol interference associated with that precoding. The step S5 of trellis decoding is still followed by the step S6 of Reed-Solomon decoding to correct errors in the result of trellis decoding and the step S7 of deformatting the result of Reed-Solomon decoding.

The submethod used for adjusting the kernel weights of the digital equalization filter in step S3 of equalizing digital equalization filter response is similar to the adjustment of the kernel weights of the digital equalization filter used in the prior art. Adjustment can be made by calculating the discrete Fourier transform (DFT) of the received data field synchronization code or a prescribed portion thereof and dividing it by the DFT of the ideal data field synchronization code or prescribed portion thereof to determine the DFT of the DTV transmission channel. The DFT of the DTV transmission channel is normalized with respect to the largest term(s) to characterize the channel, and the kernel weights of the digital equalization filter are selected to complement the normalized DFT characterizing the channel. This method of adjustment is described in greater detail by C. B. Patel et alii in U.S. Pat. No. 5,331,416 issued Jul. 19, 1994 and entitled "METHODS FOR OPERATING GHOST-CANCELATION CIRCUITRY FOR TV RECEIVER OR VIDEO RECORDER", for example. This method is preferable for initial adjustment of the kernel weights of the digital equalization filter because the initial adjustment is made more rapidly than usually it can be done using adaptive equalization. After initial adjustment of the kernel weights of the digital equalization filter, adaptive equalization methods are preferred. A block LMS method for carrying out adaptive equalization is described by J. Yang et alii in U.S. Pat. No. 5,648,987 issued Jul. 15, 1997 and entitled "RAPID-UPDATE ADAPTIVE CHANNEL-EQUALIZATION FILTERING FOR DIGITAL RADIO RECEIVERS, SUCH AS HDTV RECEIVERS". A continuous LMS method for carrying out adaptive equalization is described by A. L. R. Limberg in U.S. patent application Ser. No. 08/832,674 filed Apr. 4, 1997 and entitled "DYNAMICALLY ADAPTIVE EQUALIZER SYSTEM AND METHOD".

In the step S9 DFT can be used to implement the submethod by which the kernel weights of the digital equalization filter are adjusted to conform the response of the cascaded digital equalization filter and comb filter to an ideal response for such filter cascade. DFT is especially useful when performing rapid initial equalization based on using data-field-synchronization (DFS) code or a prescribed portion thereof as a training signal prior to switching to adaptive equalization. The discrete Fourier transform (DFT) of the received DFS code or the prescribed portion thereof, as comb filtered by the comb filter 20 for rejecting NTSC artifacts, is calculated. This DFT is then divided by the DFT of the ideal DFS code or the prescribed portion thereof, as so comb filtered, to determine the DFT characterizing the DTV transmission channel. The DFT of the DTV transmission channel is then normalized with respect to the largest term(s) to characterize the channel, and the kernel weights of the digital equalization filter are selected to complement the normalized DFT characterizing the channel. After initial adjustment of the kernel weights of the digital equalization filter, adaptive equalization methods are preferably employed. These adaptive equalization methods differ from those used when artifacts of co-channel NTSC interference are insignificant in that the number of possible valid signal states is doubled, less one, by using the comb filter 20 for rejecting NTSC artifacts.

Figure 3:
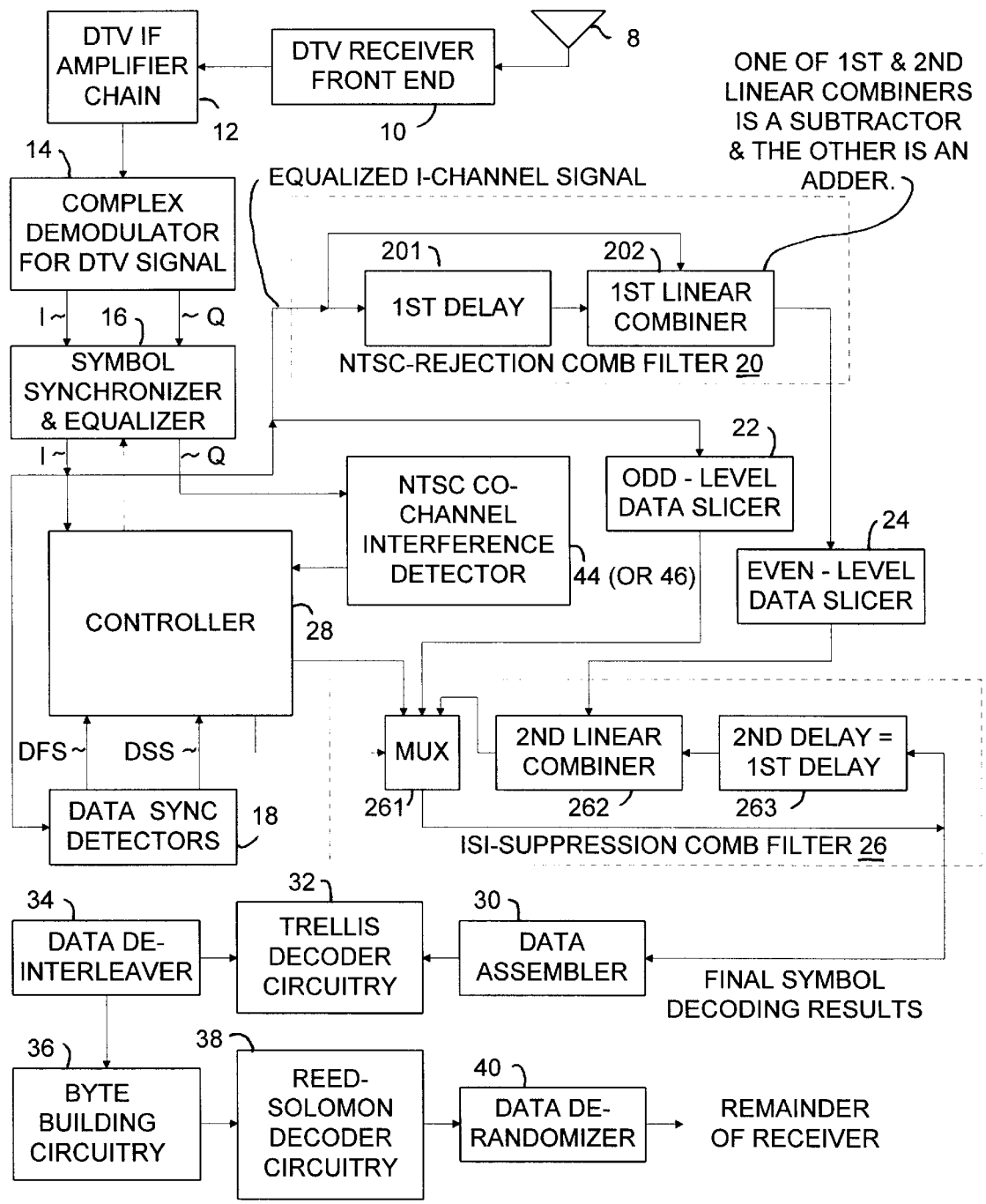
FIG. 3 is a block diagram of a portion of a DTV signal receiver that includes a symbol decoder with co-channel NTSC interference suppression circuitry selectively activated in accordance with an aspect of the invention. The selective activation depends on the response of a co-channel NTSC interference detector that includes a comb filter for extracting NTSC artifacts from baseband Q-channel signals and suppressing DTV pilot carrier accompanying those artifacts.

FIG. 3 shows a DTV signal receiver that differs from the FIG. 1 DTV signal receiver in that baseband Q-channel signal, rather than baseband I-channel signal, is applied to the co-channel NTSC interference detector 44 as its input signal. The co-channel NTSC interference detector 44 is used for detecting the strength of the artifacts arising from co-channel NTSC interference in the baseband Q-channel signal. The detection response of the co-channel NTSC interference detector 44 is insensitive to any direct bias component that may appear in the baseband Q-channel signal during the time that phase-lock of the synchronous detectors in the complex demodulator 14 is still to be established. So there is no switching between baseband signal and comb-filtered baseband signal in calculating weighting coefficients for the equalization filtering in circuitry 16. Any direct bias component that may appear in the baseband Q-channel signal following the DTV signal receiver acquiring a DTV signal (e.g., owing to poor phase-lock during weak signal reception) will not affect the detection response of the co-channel NTSC interference detector 44 either. In the FIG. 3 DTV signal receiver the determination of whether or not a significant amount of co-channel NTSC interference accompanies the received I-channel baseband signal is inferred from the determination of whether or not a significant amount of co-channel NTSC interference accompanies the received Q-channel baseband signal.

Figure 4:
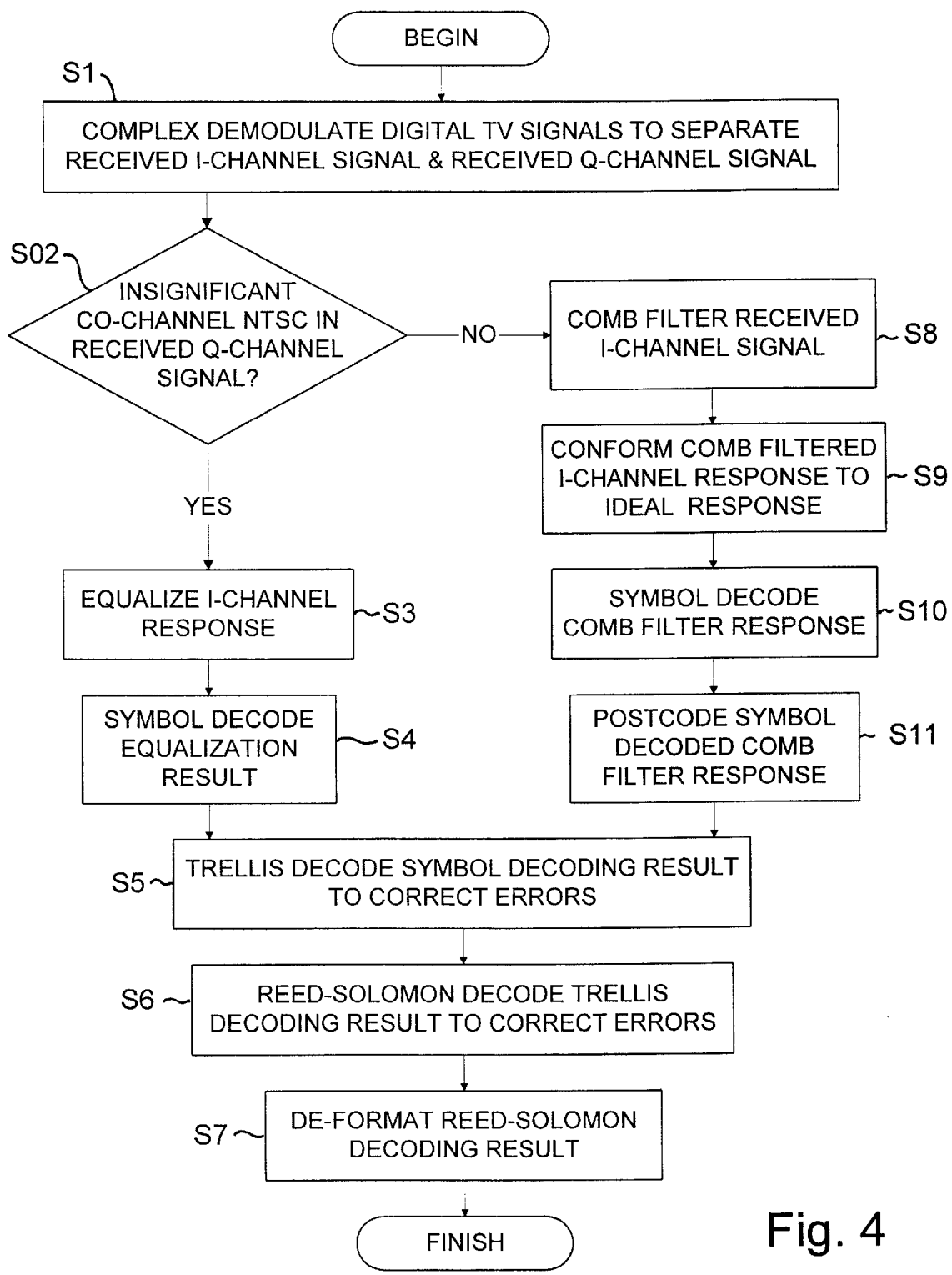
FIG. 4 is a flow chart of operation in a portion of the FIG. 3 digital television receiver showing how equalization procedures are modified depending on whether or not comb filtering to suppress co-channel NTSC interference is employed.

FIG. 4 is a flow chart showing how equalization procedures are modified in the FIG. 3 DTV signal receiver depending on whether or not comb filtering to suppress co-channel NTSC interference is employed. The FIG. 4 flowchart for the FIG. 3 DTV signal receiver differs from the FIG. 2 flowchart for the FIG. 1 DTV signal receiver in that a decision step S02 of determining whether or not a significant amount of co-channel NTSC interference accompanies the received Q-channel baseband signal replaces the decision step S2 of determining whether or not a significant amount of co-channel NTSC interference accompanies the received I-channel baseband signal.

Figures 5, 6:
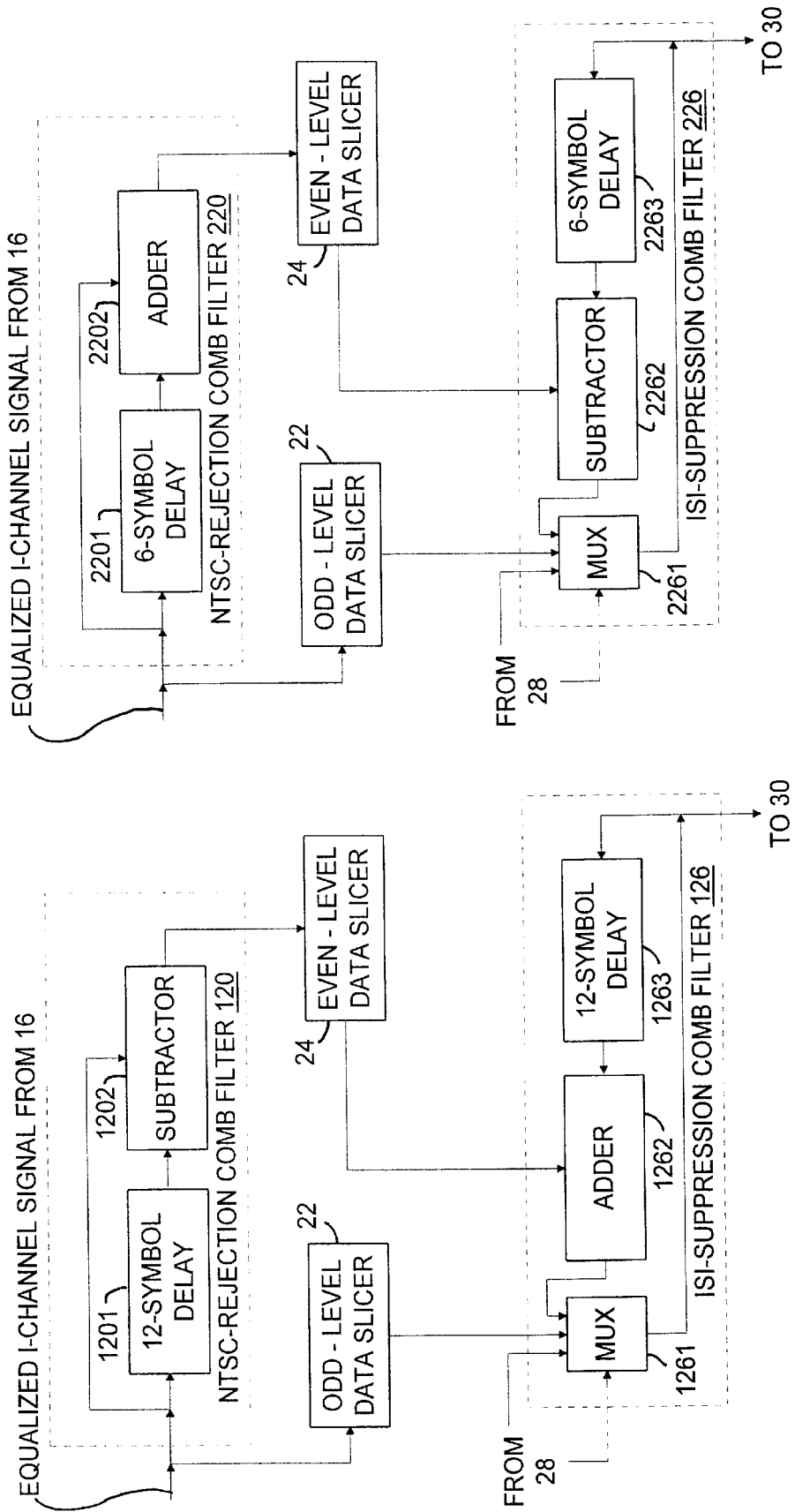
FIG. 5 is a block schematic diagram that shows details of a portion of the DTV signal receiver of FIG. 1 or FIG. 3 when the NTSC-rejection comb filter employs a 12-symbol delay.
FIG. 6 is a block schematic diagram that shows details of a portion of the DTV signal receiver of FIG. 1 or FIG. 3 when the NTSC-rejection comb filter employs a 6-symbol delay.

FIG. 5 is a block schematic diagram showing details of a portion of the DTV signal receiver of FIG. 1 or of FIG. 3 using a species 120 of the NTSC-rejection comb filter 20 and a species 126 of the ISI-suppression comb filter 26. A subtractor 1202 serves as the first linear combiner in the NTSC-rejection comb filter 120, and a modulo-8 adder 1262 serves as the second linear combiner in the ISI-suppression comb filter 126. The NTSC-rejection comb filter 120 uses a first delay device 1201 exhibiting a delay of twelve symbol epochs, and the ISI-suppression comb filter 126 uses a second delay device 1263 also exhibiting a delay of twelve symbol epochs. The 12-symbol delay exhibited by each of the delay devices 1201 and 1263 is close to one cycle delay of the artifact of the analog TV video carrier at 59.75 times the analog TV horizontal scan frequency $f_H$. The 12-symbol delay is close to five cycles of the artifact of the analog TV chrominance subcarrier at 287.25 times $f_H$. The 12-symbol delay is close to six cycles of the artifact of the analog TV sound carrier at 345.75 times $f_H$. This is the reason that the differentially combined response of the subtractor 1202 to the audio carrier, to the video carrier and to frequencies close to chrominance subcarrier differentially delayed by the first delay device 1201 tends to have reduced co-channel interference. However, in portions of a video signal in which edges cross a horizontal scan line, the amount of correlation in the analog TV video signal at such distances in the horizontal spatial direction is quite low.

A species 1261 of the multiplexer 261 is controlled by a multiplexer control signal that is in its second state most of the time when it is determined there is insufficient co-channel NTSC interference to cause uncorrectable error in the output signal from the data-slicer 22. This multiplexer control signal is in its third state most of the time when it is determined there is sufficient co-channel NTSC interference to cause uncorrectable error in the output signal from the data-slicer 22. The multiplexer 1261 is conditioned by its control signal being in its third state to feed back the modulo-8 sum results of the adder 1262, as delayed twelve symbol epochs by the delay device 1263, to the adder 1262 as a summand. This is a modular accumulation procedure in which a single error propagates as a running error, with error recurring every twelve symbol epochs. Running errors in the ISI-suppression-filtered symbol decoding results from the ISI-suppression comb filter 126 are curtailed by the multiplexer 1261 being placed into its first state for four symbol epochs at the beginning of each data segment, as well as during the entirety of each data segment containing data-field-synchronizing (DFS) code. When this control signal is in its first state, the multiplexer 1261 reproduces as its output signal the ideal symbol decoding results supplied from memory in the controller 28. The introduction of ideal symbol decoding results into the multiplexer 1261 output signal halts any running error. Since there are 4+69(12) symbols per data segment, the ideal symbol decoding results slip back four symbol epochs in phase each data segment, so no running error can persist for longer than three data segments.

FIG. 6 is a block schematic diagram showing details of a portion of the DTV signal receiver of FIG. 1 or of FIG. 3 using a species 220 of the NTSC-rejection comb filter 20 and a species 226 of the ISI-suppression comb filter 26. The NTSC-rejection comb filter 220 uses a first delay device 2201 exhibiting a delay of six symbol epochs, and the ISI-suppression comb filter 226 uses a second delay device 2263 also exhibiting a delay of six symbol epochs. The 6-symbol delay exhibited by each of the delay devices 2201 and 2263 is close to 0.5 cycle delay of the artifact of the analog TV video carrier at 59.75 times the analog TV horizontal scan frequency $f_H$. The 6-symbol delay is close to 2.5 cycles of the artifact of the analog TV chrominance subcarrier at 287.25 times $f_H$. And the 6-symbol delay is close to 3 cycles of any artifact of the analog TV audio carrier at 345.75 times $f_H$. An adder 2202 serves as the first linear combiner in the NTSC-rejection comb filter 220, and a modulo-8 subtractor 2262 serves as the second linear combiner in the ISI-suppression comb filter 226. The delay exhibited by the delay devices 2201 and 2263 is shorter than the delay exhibited by the delay devices 1201 and 1263. So there is more likely to be good anti-correlation in the signals additively combined by the adder 2202 than there is likely to be good correlation in the signals differentially combined by the subtractor 1202. The artifacts converted from frequencies near analog TV video carrier and chroma subcarrier are trap filtered over wider rejection-frequency bands in the NTSC-rejection comb filter 220 response than in the NTSC-rejection comb filter 120 response. The NTSC sound carrier artifacts are trap-filtered by the NTSC-rejection comb filter 120, but are not trap-filtered by the NTSC-rejection comb filter 220. However, if the sound carrier of a co-channel interfering analog TV signal has been suppressed by SAW filtering or a sound trap in the IF amplifier chain 12, the inferior sound rejection of the comb filter 220 is not a problem. The responses to sync tips is reduced in duration using the NTSC-rejection comb filter 220 of FIG. 6 rather than the NTSC-rejection comb filter 120 of FIG. 5, so there is substantially reduced tendency to overwhelm error-correction in the trellis decoding and Reed-Solomon coding.

A species 2261 of the multiplexer 261 is controlled by a multiplexer control signal that is in its second state most of the time when it is determined there is insufficient co-channel NTSC interference to cause uncorrectable error in the output signal from the data-slicer 22. This control signal is in its third state most of the time when it is determined there is sufficient co-channel NTSC interference to cause uncorrectable error in the output signal from the data-slicer 22. The multiplexer 2261 is conditioned by its control signal being in its third state to feed back the modulo-8 sum results of the adder 2262, as delayed six symbol epochs by the delay device 2263, to the adder 2262 as a summand. This is a modular accumulation procedure in which a single error propagates as a running error, with error recurring every six symbol epochs. Running errors in the ISI-suppression-filtered symbol decoding results from the ISI-suppression comb filter 226 are curtailed by the multiplexer 2261 being placed into its first state for four symbol epochs at the beginning of each data segment, as well as during the entirety of each data segment containing data field sync. When control signal for the multiplexer 2261 is in its first state, the multiplexer 2261 reproduces as its output signal the ideal symbol decoding results supplied from memory in the controller 28. The introduction of ideal symbol decoding results into the multiplexer 2261 output signal halts any running error. Since there are 4+138(6) symbols per data segment, the ideal symbol decoding results slip back four symbol epochs in phase each data segment, so no running error can persist for longer than two data segments. The likelihood of a protracted period of running error in the ISI-suppression comb filter 226 is substantially less than in the ISI-suppression comb filter 126, although the running error recurs more frequently and affects twice as many of the twelve interleaved trellis codes.

Figures 7, 8:
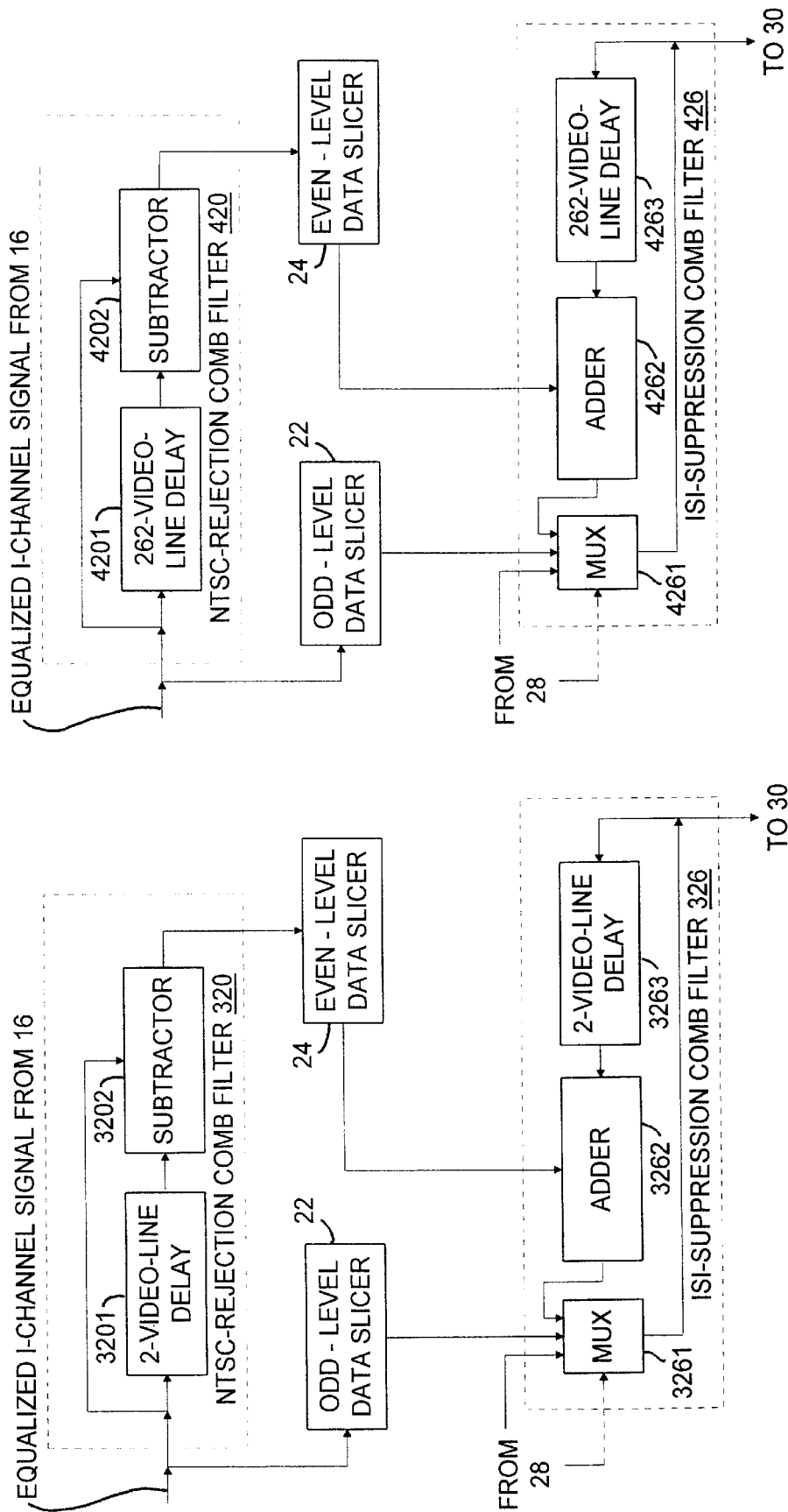
FIG. 7 is a block schematic diagram that shows details of a portion of the DTV signal receiver of FIG. 1 or FIG. 3 when the NTSC-rejection comb filter employs a 2-video-line (1368-symbol) delay.
FIG. 8 is a block schematic diagram that shows details of a portion of the DTV signal receiver of FIG. 1 or FIG. 3 when the NTSC-rejection comb filter employs a 262-video-line (179,208-symbol) delay.

FIG. 7 is a block schematic diagram showing details of a portion of the DTV signal receiver of FIG. 1 or of FIG. 3 using a species 320 of the NTSC-rejection comb filter 20 and a species 326 of the ISI-suppression comb filter 26. The NTSC-rejection comb filter 320 uses a first delay device 3201 exhibiting a delay of 1368 symbol epochs, which delay is substantially equal to the epoch of two horizontal scan lines of an analog TV signal. The ISI-suppression comb filter 326 uses a second delay device 3263 also exhibiting a delay of 1368 symbol epochs. The first linear combiner in the NTSC-rejection comb filter 320 is a subtractor 3202, and the second linear combiner in the ISI-suppression comb filter 326 is a modulo-8 adder 3262.

A species 3261 of the multiplexer 261 is controlled by a multiplexer control signal that is in its second state most of the time when it is determined there is insufficient co-channel NTSC interference to cause uncorrectable error in the output signal from the data-slicer 22. The multiplexer control signal is in its third state most of the time when it is determined there is sufficient co-channel NTSC interference to cause uncorrectable error in the output signal from the data-slicer 22. The DTV signal receiver preferably contains circuitry for detecting change between alternate scan lines in the NTSC co-channel interference, so that the controller 28 can withhold supplying the third state of the multiplexer 3261 control signal under such conditions.

The multiplexer 3261 is conditioned by its control signal being in its third state to feed back the modulo-8 sum results of the adder 3262, as delayed 1368 symbol epochs by the delay device 3263, to the adder 3262 as a summand. This is a modular accumulation procedure in which a single error propagates as a running error, with error recurring every 1368 symbol epochs. This symbol code span is longer than the span for a single block of the Reed-Solomon code, so a single running error is readily corrected during Reed-Solomon decoding. Running errors in the ISI-suppression-filtered symbol decoding results from the ISI-suppression comb filter 326 are curtailed by the multiplexer 3261 being placed into its first state during the entirety of each data segment containing field sync, as well as for four symbol epochs at the beginning of each data segment. When this control signal is in its first state, the multiplexer 3261 reproduces as its output signal the ideal symbol decoding results supplied from memory in the controller 28. The introduction of ideal symbol decoding results into the multiplexer 3261 output signal halts any running error. The 16.67 millisecond duration of an NTSC video field exhibits phase slippage against the 24.19 millisecond duration of a DTV data field, so the DTV data segments containing field sync eventually scan the entire NTSC frame raster. The 525 lines in the NTSC frame raster each contain 684 symbol epochs, for a total of 359,100 symbol epochs. This is somewhat less than 432 times the 832 symbol epochs in a DTV data segment containing field sync. So, one can guess with reasonable confidence that running errors of duration longer than 432 data fields will be expunged by the multiplexer 3261 reproducing ideal symbol decoding results during DTV data segments containing data field sync. There is also phase slippage between data segments, for the start code groups of which ideal symbol decoding results are available, and NTSC video scan lines. One can estimate 359,100 symbol epochs, which is 89,775 times the four symbol epochs in a code start group, are scanned during 89,775 consecutive data segments. Since there are 313 data segments per DTV data field, one can guess with reasonable confidence that running errors of duration longer than 287 data fields will be expunged by the multiplexer 3261 reproducing ideal symbol decoding results during the code start groups. The two sources of suppression of running errors are reasonably independent of each other, so running errors of duration longer than two hundred or so data fields are quite unlikely. Furthermore, if co-channel NTSC interference dips low at a time when the running error recurs, to condition the multiplexer 3261 for reproducing the response of the dataslicer 22 as its output signal, the error may be corrected earlier than would otherwise be the case.

The FIG. 7 NTSC-rejection comb filter 320 is quite good in suppressing demodulation artifacts generated in response to analog TV horizontal synchronizing pulses, as well as suppressing many of the demodulation artifacts generated in response to analog TV vertical synchronizing pulses and equalizing pulses. These artifacts are the co-channel interference with highest energy. Except where there is scan-line-to-scan-line change in the video content of the analog TV signal over the period of two scan lines, the NTSC-rejection comb filter 320 provides reasonably good suppression of that video content regardless of its color. The suppression of the FM audio carrier of the analog TV signal is reasonably good, in case it has not been suppressed by a tracking rejection filter in the symbol synchronization and equalization circuitry 16. Artifacts of most analog TV color bursts are suppressed in the NTSC-rejection comb filter 320 response, too. Furthermore, the NTSC-rejection comb filter 320 provides filtering that is "orthogonal" to the NTSC-interference rejection built into the trellis decoding procedures.

FIG. 8 is a block schematic diagram showing details of a portion of the DTV signal receiver of FIG. 1 or of FIG. 3 using a species 420 of the NTSC-rejection comb filter 20 and a species 426 of the ISI-suppression comb filter 26. The NTSC-rejection comb filter 420 uses a first delay device 4201 exhibiting a delay of 179,208 symbol epochs. This delay is substantially equal to the period of 262 horizontal scanning lines of an analog TV signal, and the ISI-suppression comb filter 426 uses a second delay device 4261 also exhibiting such delay. A subtractor 4202 serves as the first linear combiner in the NTSC-rejection comb filter 420, and a modulo-8 adder 4262 serves as the second linear combiner in the ISI-suppression comb filter 426.

A species 4261 of the multiplexer 261 is controlled by a multiplexer control signal that is in its second state most of the time when it is determined there is insufficient co-channel NTSC interference to cause uncorrectable error in the output signal from the data-slicer 22. This multiplexer control signal is in its third state most of the time when it is determined there is sufficient co-channel NTSC interference to cause uncorrectable error in the output signal from the data-slicer 22. The DTV signal receiver preferably contains circuitry for detecting field-to-field change in the co-channel NTSC interference, so that the controller 28 can withhold supplying the third state of the multiplexer 4261 control signal under such conditions.

The multiplexer 4261 is conditioned by its control signal being in its third state to feed back the modulo-8 sum results of the adder 4262, as delayed 179,208 symbol epochs by the delay device 4263, to the adder 4262 as a summand. This is a modular accumulation procedure in which a single error propagates as a running error, with error recurring every 179,208 symbol epochs. This symbol code span is longer than the span for a single block of the Reed-Solomon code, so a single running error is readily corrected during Reed-Solomon decoding. Running errors in the ISI-suppression-filtered symbol decoding results from the ISI-suppression comb filter 426 are curtailed by the multiplexer 4261 being placed into its first state during the entirety of each data segment containing field sync, as well as for four symbol epochs at the beginning of each data segment. When this control signal is in its first state, the multiplexer 4261 reproduces as its output signal the ideal symbol decoding results supplied from memory in the controller 28. The introduction of ideal symbol decoding results into the multiplexer 4261 output signal halts any running error. The maximum number of data fields required to expunge running error in the multiplexer 4261 output signal is presumably substantially the same as required to expunge running error in the multiplexer 3261 output signal. However, the number of times the error recurs in that period is lower by a factor of 131.

The FIG. 8 NTSC-rejection comb filter 420 suppresses most demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 420 suppresses artifacts arising from the video content of the analog TV signal that does not change from field to field or line-to-line, getting rid of stationary patterns irrespective of their horizontal spatial frequency or color. Artifacts of most analog TV color bursts are suppressed in the NTSC-rejection comb filter 420 response, too.

FIG. 9 is a block schematic diagram showing details of a portion of the DTV signal receiver of FIG. 1 or of FIG. 3 using a species 520 of the NTSC-rejection comb filter 20 and a species 526 of the ISI-suppression comb filter 26. The NTSC-rejection comb filter 520 uses a first delay device 5201 exhibiting a delay of 718,200 symbol epochs, which delay is substantially equal to the period of two frames of an analog TV signal, and the ISI-suppression comb filter 526 uses a second delay device 5261 also exhibiting such delay. A subtractor 5202 serves as the first linear combiner in the NTSC-rejection comb filter 520, and a modulo-8 adder 5262 serves as the second linear combiner in the ISI-suppression comb filter 526.

A species 5261 of the multiplexer 261 is controlled by a multiplexer control signal that is in its second state most of the time when it is determined there is insufficient co-channel NTSC interference to cause uncorrectable error in the output signal from the data-slicer 22. This multiplexer control signal is in its third state most of the time when it is determined there is sufficient co-channel NTSC interference to cause uncorrectable error in the output signal from the data-slicer 22. The DTV signal receiver preferably contains circuitry for detecting change between alternate frames in the NTSC co-channel interference, so that the controller 28 can withhold supplying the third state of the multiplexer 5261 control signal under such conditions.

The multiplexer 5261 is conditioned by its control signal being in its third state to feed back the modulo-8 sum results of the adder 5262, as delayed 718,200 symbol epochs by the delay device 5263, to the adder 5262 as a summand. This is a modular accumulation procedure in which a single error propagates as a running error, with error recurring every 718,200 symbol epochs. This symbol code span is longer than the span for a single block of the Reed-Solomon code, so a single running error is readily corrected during Reed-Solomon decoding. Running errors in the ISI-suppression-filtered symbol decoding results from the ISI-suppression comb filter 526 are curtailed by the multiplexer 5261 being placed into its first state during the entirety of each data segment containing field sync, as well as for four symbol epochs at the beginning of each data segment. When this control signal is in its first state, the multiplexer 5261 reproduces as its output signal ideal symbol decoding results supplied from memory in the controller 28. The introduction of ideal symbol decoding results into the multiplexer 5261 output signal halts any running error. The maximum number of data fields required to expunge running error in the multiplexer 5261 output signal is presumably substantially the same as required to expunge running error in the multiplexer 3261 output signal. However, the number of times the error recurs in that period is lower by a factor of 525.

The FIG. 9 NTSC-rejection comb filter 520 suppresses all demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 520 suppresses artifacts arising from the video content of the analog TV signal that does not change over two frames, getting rid of such very stationary patterns irrespective of their spatial frequency or color. Artifacts of all analog TV color bursts are suppressed in the NTSC-rejection comb filter 520 response, too.

FIG. 10 shows a general form the co-channel NTSC interference detector 44 takes in the DTV signal receivers of FIGS. 1 and 3. A node 440 receives input signal for the detector 44. This input signal can be equalized I-channel or Q-channel baseband signal supplied from the symbol synchronizer circuitry 16, as in the DTV signal receivers of FIGS. 1 and 3 respectively. This input signal can instead be I-channel or Q-channel baseband signal supplied without equalization from the complex demodulator 14 in a modification of the FIG. 1 or FIG. 3 DTV signal receiver. In an NTSC-rejection comb filter within the detector 44 a third delay device 441 differentially delays the input signal applied to the node 440 to generate minuend and subtrahend input signals for a digital subtractor 442. The difference output signal from the subtractor 442 is an NTSC-rejection comb filter response R in which artifacts arising from synchronous detection of the co-channel interfering analog television signal are suppressed. In an NTSC-selection comb filter within the detector 44 a fourth delay device 443 differentially delays the input signal applied to the node 440 to generate minuend and subtrahend input signals for a digital subtractor 444. The difference output signal from the subtractor 444 is an NTSC-selection comb filter response S in which artifacts arising from synchronous detection of the co-channel interfering analog television signal are reinforced. A direct term of system characteristic arising from the synchronous detection of the pilot carrier is suppressed both in the NTSC-rejection comb filter response R and in the NTSC-selection comb filter response S.

The amplitude of the NTSC-rejection comb filter response R from the subtractor 442 is detected by an amplitude detector 445, and the amplitude of the NTSC-selection comb filter response S from the subtractor 444 is detected by an amplitude detector 446. An amplitude comparator 447 compares the results of amplitude detection by the amplitude detectors 445 and 446 to generate an output bit indicative of whether or not the response of the amplitude detector 446 substantially exceeds the response of the amplitude detector 445. This output bit is used for selecting between the second and third states of multiplexer 261 operation. For example, this output bit from the amplitude comparator 447 can be one of two control bits the controller 28 supplies to the multiplexer 261 in the ISI-suppression comb filter 26 of FIG. 1 or of FIG. 3. The other control bit is indicative of whether or not signal supplied from the controller 28 is to be reproduced in the multiplexer 261 response.

The amplitude detectors 445 and 446 can, by way of example, be envelope detectors with a time constant equal to several data sample intervals, so that differences in the data components of their input signals tend to average out to low value supposing these data components to be random. Amplitude differences in random noise accompanying the difference output signals of the subtractors 442 and 444 tend to average out to zero as well. Accordingly, when the amplitude comparator 447 indicates that the amplitude detection responses of amplitude detectors 445 and 446 differ more than a prescribed amount, this is also indicative that artifacts of any co-channel interfering analog television signal are above a significant level in the baseband signal supplied to node 440. This significant level corresponds to the significant level for the equalized I-channel baseband signal applied to the odd-level data slicer 22. Errors in symbol decoding done by simply data slicing the I-channel baseband signal are correctable by the trellis and Reed-Solomon error-correction coding, so long as artifacts of co-channel NTSC signal remain below this significant level.

Artifacts of co-channel NTSC interference are rejected in the comb filter response R from the subtractor 442, and artifacts of co-channel NTSC interference are selected in the comb filter response S from the subtractor 444. When the amplitude of the comb filter response S is substantially larger than the amplitude of the comb filter response R, this difference can then be presumed to be caused by the presence of artifacts of co-channel NTSC interference in the signal at node 440. The output bit supplied by the amplitude comparator 447 for this condition conditions the multiplexer 261 not to be operable in its second state, thereby deselecting the interim symbol decoding results from the odd-level data slicer 22 from appearing as final symbol decoding results from the multiplexer 261.

When the amplitude of the comb filter response S is not substantially larger than the amplitude of the comb filter response R, this lack of difference can be presumed to indicate the absence of artifacts of co-channel NTSC interference in the signal at node 440. The output bit supplied by the amplitude comparator 447 for this condition conditions the multiplexer 261 not to be operable in its third state, thereby deselecting the ISI-suppression-filtered symbol decoding results from the second linear combiner 262 from appearing as final symbol decoding results from the multiplexer 261.

A 6-symbol delay device 1443 is used as the fourth delay device 443 in preferred embodiments of the co-channel NTSC interference detector 44 shown in FIGS. 11–14.

FIG. 11 shows a species 144 of the FIG. 10 co-channel NTSC interference detector 44 particularly well suited for use with the symbol decoding apparatus of FIG. 5. A third delay device 1441 provides 12-symbol differential delay between the minuend and subtrahend input signals for the subtractor 442 in a comb filter that suppresses artifacts of the co-channel NTSC interference that accompany the baseband signal supplied to the node 440. These artifacts can have arisen from analog TV signal components at frequencies approximating the frequencies of the video carrier, color subcarrier and audio carrier. In certain less preferred embodiments of the invention the third delay device 441 is chosen to have delay of slightly more or slightly less than the duration of an NTSC horizontal scan line, to suppress artifacts of the co-channel NTSC interference that have arisen from analog TV signal components at frequencies approximating the frequencies of the video carrier and color subcarrier.

FIG. 12 shows a species 344 of the FIG. 10 co-channel NTSC interference detector 44 particularly well suited for use with the symbol decoding apparatus of FIG. 7. In the co-channel NTSC interference detector 344 a 1368-symbol third delay device 3441 provides 2-video-line duration differential delay in the NTSC-rejection comb filter used for suppressing artifacts of co-channel NTSC interference.

FIG. 13 shows a species 444 of the FIG. 10 co-channel NTSC interference detector 44 particularly well suited for use with the symbol decoding apparatus of FIG. 8. In the co-channel NTSC interference detector 444 a 179,208-symbol third delay device 4441 provides 262-video-line duration differential delay in the NTSC-rejection comb filter used for suppressing artifacts of co-channel NTSC interference.

FIG. 14 shows a species 544 of the FIG. 10 co-channel NTSC interference detector 44 particularly well suited for use with the symbol decoding apparatus of FIG. 9. In the co-channel NTSC interference detector 544 a 718,200-symbol delay device 5441 providing 2-video-frame duration differential delay is used as the third delay device in the NTSC-rejection comb filter used for suppressing artifacts of co-channel NTSC interference.

Figure 15:
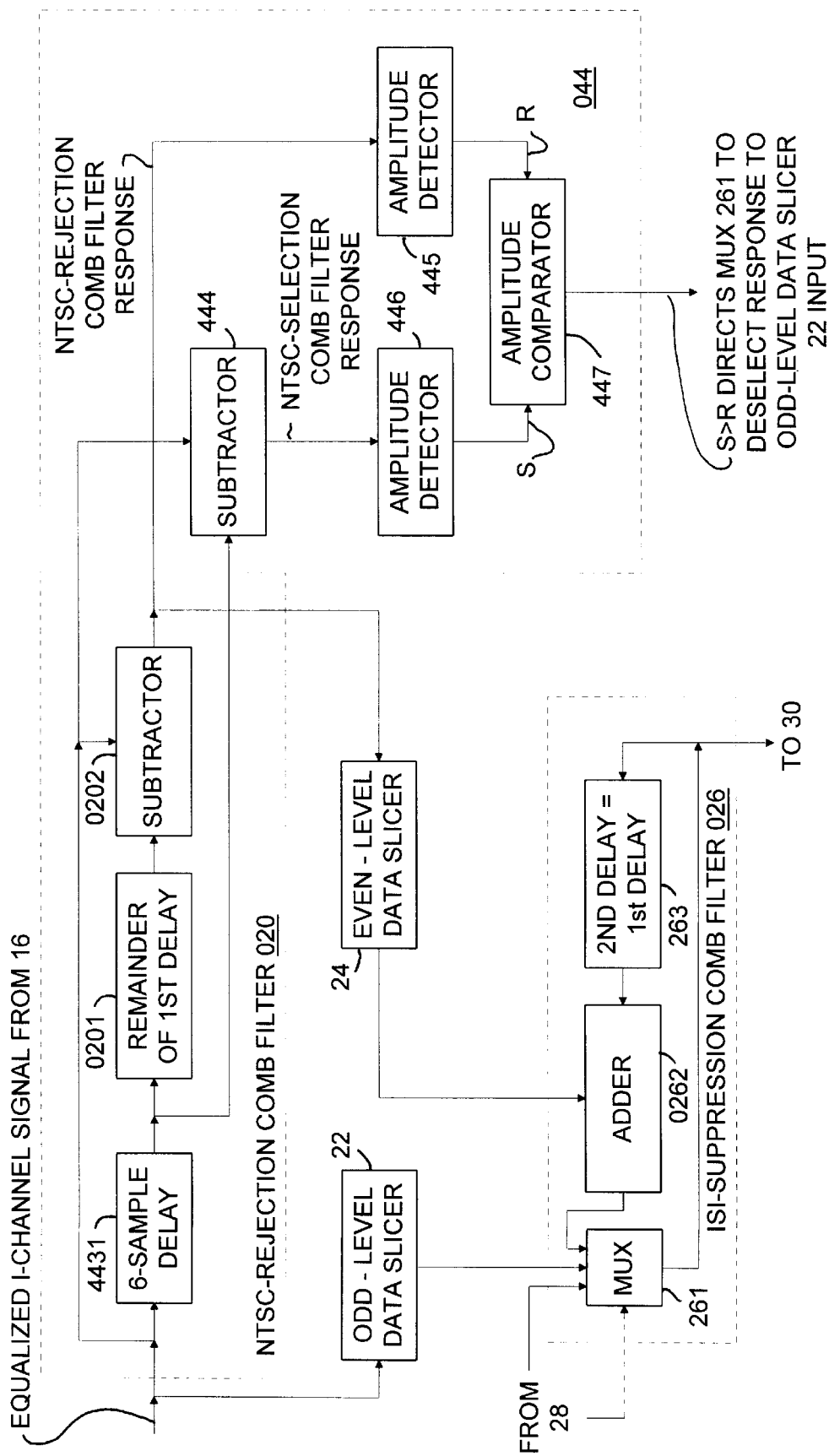
FIG. 15 is a block schematic diagram of a species of the FIG. 10 co-channel NTSC interference detector sharing elements with the NTSC-rejection comb filter preceding the even-level data slicer of the FIG. 1 DTV signal receiver.

FIG. 15 shows how a certain species 044 of the FIG. 5 co-channel NTSC interference detector 44 can share the fourth delay 443 as a portion of the first delay in certain species 020 of the NTSC-rejection comb filter 20. The remaining portion 0201 of the first delay is cascaded with the fourth delay portion 443 to differentially delay the input signal supplied to the node 440 to generate minuend and subtrahend input signals for a digital subtractor 0202. The subtractor 0202 serves as the first linear combiner in the NTSC-rejection comb filter 020. The difference output signal from the subtractor 0202 supplies NTSC-rejection comb filter response to the amplitude detector 445 as its input signal, in addition to supplying that NTSC-rejection comb filter response to even-level data slicer 24 as its input signal. The third delay 441 is provided by the cascaded elements 443 and 0201 that also provide the first delay in the NTSC-rejection comb filter 020; and the subtractor 442 is provided by the subtractor 0262 in the NTSC-rejection comb filter 020. So, in FIG. 15 the elements 441 and 442 are subsumed in the NTSC-rejection comb filter 020 and do not separately appear. Intersymbol interference introduced by the NTSC-rejection comb filter 020 is suppressed by a species 026 of ISI-suppression comb filter 26 that uses a modulo-8 digital subtractor 0262 as the second linear combiner.

Figures 16, 17:
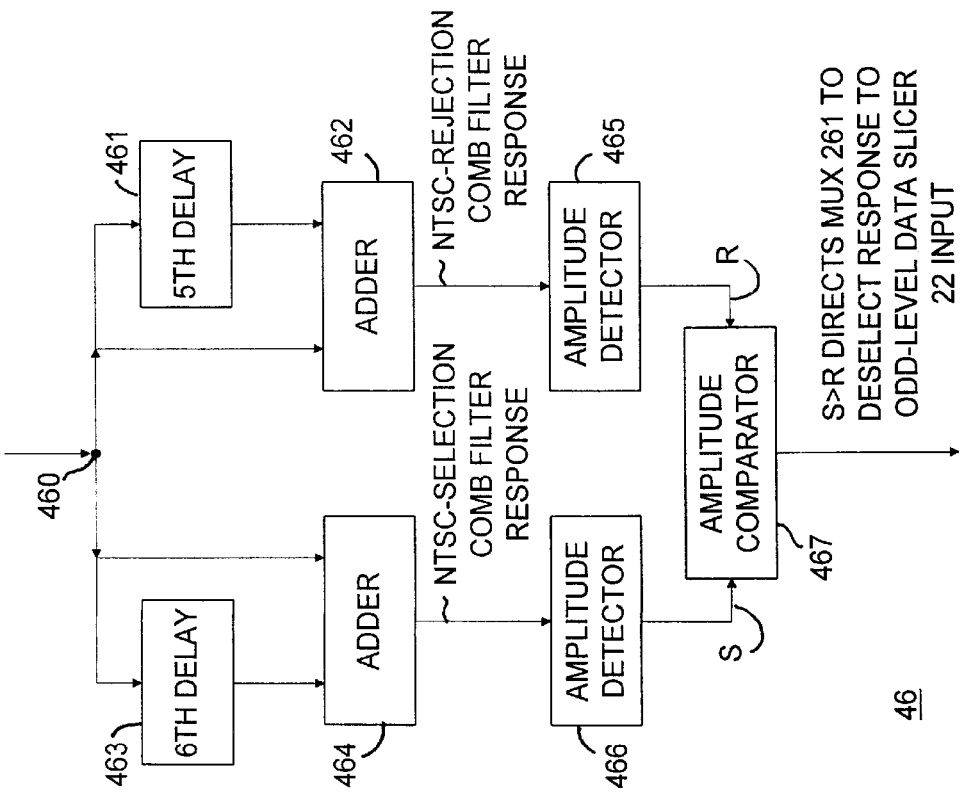
FIG. 16 is a block diagram of an alternative general form taken by a co-channel NTSC interference detector constructed in accordance with the invention. The pair of comb filters in the FIG. 10 detector each additively combine differentially-delayed detector input signal.
FIG. 17 is a block schematic diagram of a species of the FIG. 16 co-channel NTSC interference detector the input signal of which is additively combined with itself as subjected to 6-symbol differential delay in a comb filter used for suppressing artifacts of co-channel NTSC interference.

FIG. 16 shows a alternative general form 46 the co-channel NTSC interference detector can take in the DTV signal receivers of FIGS. 1 and 3. A node 460 receives input signal for the co-channel NTSC interference detector 46. This input signal can be equalized I-channel or Q-channel baseband signal supplied from the symbol synchronizer circuitry 16, as in the DTV signal receivers of FIGS. 1 and 3 respectively. This input signal can instead be I-channel or Q-channel baseband signal supplied without equalization from the complex demodulator 14 in a modification of the FIG. 1 or FIG. 3 DTV signal receiver. In an NTSC-rejection comb filter within the detector 46 a fifth delay device 461 differentially delays the input signal applied to the node 460 to generate summand input signals for a digital adder 462. The sum output signal from the subtractor 462 is an NTSC-rejection comb filter response R in which artifacts arising from synchronous detection of the co-channel interfering analog television signal are suppressed. In an NTSC-selection comb filter within the detector 46 a sixth delay device 463 differentially delays the input signal applied to the node 460 to generate summand input signals for a digital adder 464. The sum output signal from the adder 464 is an NTSC-selection comb filter response S in which artifacts arising from synchronous detection of the co-channel interfering analog television signal are reinforced. In the co-channel NTSC interference detector 46 the direct term of system characteristic arising from the synchronous detection of the pilot carrier is reinforced both in the NTSC-rejection comb filter response R and in the NTSC-selection comb filter response S, rather than being suppressed as in the co-channel NTSC interference detector 44.

The amplitude of the NTSC-rejection comb filter response R from the adder 462 is detected by an amplitude detector 465, and the amplitude of the NTSC-selection comb filter response S from the adder 464 is detected by an amplitude detector 466. An amplitude comparator 467 compares the results of amplitude detection by the amplitude detectors 465 and 466 to generate an output bit indicative of whether or not the response of the amplitude detector 466 substantially exceeds the response of the amplitude detector 465. This output bit is used for selecting between the second and third states of multiplexer 261 operation. For example, this output bit from the amplitude comparator 467 can be one of two control bits the controller 28 supplies to the multiplexer 261 in the ISI-suppression comb filter 26 of FIG. 1 or of FIG. 3. The other control bit is indicative of whether or not signal supplied from the controller 28 is to be reproduced in the multiplexer 261 response.

The amplitude detectors 465 and 466 can, by way of example, be envelope detectors with a time constant equal to several data sample intervals, so that differences in the data components of their input signals tend to average out to low value supposing these data components to be random. Amplitude differences in random noise and direct terms accompanying the sum output signals of the adders 462 and 464 tend to average out to zero as well. Accordingly, when the amplitude comparator 467 indicates that the amplitude detection responses of amplitude detectors 465 and 466 differ more than a prescribed amount, this is also indicative that artifacts of any co-channel interfering analog television signal are above a significant level in the baseband signal supplied to node 460. This significant level corresponds to the significant level for the equalized I-channel baseband signal applied to the odd-level data slicer 22. Errors in symbol decoding done by simply data slicing the I-channel baseband signal are correctable by the trellis and Reed-Solomon error-correction coding, so long as artifacts of co-channel NTSC signal remain below this significant level.

Artifacts of co-channel NTSC interference are rejected in the comb filter response R from the subtractor 462, and artifacts of co-channel NTSC interference are selected in the comb filter response S from the subtractor 464. When the amplitude of the comb filter response S is substantially larger than the amplitude of the comb filter response R, this difference can then be presumed to be caused by the presence of artifacts of co-channel NTSC interference in the signal at node 460. The output bit supplied by the amplitude comparator 467 for this condition conditions the multiplexer 261 not to be operable in its second state, thereby deselecting the interim symbol decoding results from the odd-level data slicer 22 from appearing as final symbol decoding results from the multiplexer 261.

When the amplitude of the comb filter response S is not substantially larger than the amplitude of the comb filter response R, this lack of difference can be presumed to indicate the absence of artifacts of co-channel NTSC interference in the signal at node 460. The output bit supplied by the amplitude comparator 467 for this condition conditions the multiplexer 261 not to be operable in its third state, thereby deselecting the ISI-suppression-filtered symbol decoding results from the second linear combiner 262 from appearing as final symbol decoding results from the multiplexer 261.

FIG. 17 shows a species 244 of the FIG. 16 co-channel NTSC interference detector 46 particularly well suited for use with the symbol decoding apparatus of FIG. 6. A fifth delay device 2461 provides 6-symbol differential delay between the summand input signals for the adder 462 in a comb filter that suppresses artifacts of the co-channel NTSC interference that accompany the baseband signal supplied to the node 460. These artifacts can have arisen from analog TV signal components at frequencies approximating the frequencies of the video carrier and color subcarrier. A sixth delay device 2463 provides 12-symbol differential delay between the summand input signals for the adder 464 in a comb filter that reinforces artifacts of the co-channel NTSC interference that arise from frequencies near the video carrier and color subcarrier and that accompany the baseband signal supplied to the node 460.

FIG. 18 shows a modification of the FIG. 1 DTV signal receiver as thusfar described, constructed in accordance with a further aspect of the invention so as to utilize a plurality of parallelly operated even-level data slicers A24, B24 and C24. Each of these data slicers is preceded by a respective NTSC-rejection comb filter and succeeded by a respective ISI-suppression comb filter. The even-level data-slicer A24 converts the response of an NTSC-rejection filter A20 of a first type to first precoded symbol decoding results for application to an ISI-suppression comb filter A26 of a first type. The even-level data-slicer B24 converts the response of an NTSC-rejection filter B20 of a second type to second comb-filtered symbol decoding results for application to an ISI-suppression comb filter B26 of a second type. The even-level data-slicer C24 converts the response of an NTSC-rejection filter C20 of a third type to third comb-filtered symbol decoding results for application to an ISI-suppression comb filter C26 of a third type. The odd-level data-slicer 22 supplies interim symbol decoding results to the ISI-suppression comb filters A26, B26 and C26. The prefixes A, B and C in the identification numbers for the elements of FIG. 18 are different integers which will correspond to respective ones of the integers 1, 2, 3, 4 and 5 when receiver portions as shown in ones of FIGS. 5, 6, 7, 8 and 9 are employed.

A co-channel interference detector A44 of a first type determines from the Q-channel signal how effective the NTSC-rejection filter A20 of first type will be in reducing co-channel interference from an analog TV signal in the current equalized I-channel signal. A co-channel interference detector B44 of a second type determines from the Q-channel signal how effective the NTSC-rejection filter B20 of second type will be in reducing co-channel interference from an analog TV signal in the current equalized I-channel signal. A co-channel interference detector C44 of a third type determines from the Q-channel signal how effective the NTSC-rejection filter C20 of third type will be in reducing co-channel interference from an analog TV signal in the current equalized I-channel signal. The suppression of the pilot carrier in the Q-channel signal facilitates the co-channel interference detectors A44, B44 and C44 providing indications of the relative effectiveness of the NTSC-rejection comb filters A20, B20 and C20.

Symbol decoding selection circuitry 90 generates a best estimate of correct symbol decoding for application to the data assembler 30. This best estimate is generated by selecting among ideal symbol decoding results from the controller 28, interim symbol decoding results from the odd-level data slicer 22, and ISI-suppression-filtered symbol decoding results from the ISI-suppression comb filters A26, B26 and C26. The symbol decoding selection circuitry 90 responds to indications of effectiveness from the co-channel interference detectors A44, B44 and C44 to formulate this best estimate unless the controller 28 supplies further symbol selection information to the symbol decoding selection circuitry 90. The further symbol selection information supplied from the controller 28 includes indications of when synchronizing codes occur, which indications condition the best estimate to be made based on ideal symbol decoding results from the controller 28. The best estimate of symbol decoding results is used to correct the summation procedures in the matching comb filters A26, B26 and C26 in preferred embodiments of the FIG. 18 DTV signal receiver.

If the co-channel interference detectors A44, B44 and C44 all indicate lack of substantial artifacts from co-channel NTSC interference at times other than when synchronizing codes occur, the symbol decoding selection circuitry 90 responds to select the interim symbol decoding results from the odd-level data slicer 22 as the best estimate of correct symbol decoding results. This minimizes the effect of Johnson noise on symbol decoding.

If at least one of the co-channel interference detectors A44, B44 and C44 indicates substantial artifacts from co-channel NTSC interference at times other than when synchronizing codes occur, the symbol decoding selection circuitry 90 responds to select the ISI-suppression-filtered symbol decoding results from the ISI-suppression comb filter A26, B26 or C26 following the one of the NTSC-rejection comb filters A20, B20 and C20 that best suppresses artifacts from co-channel NTSC interference as determined by the co-channel interference detectors A44, B44 and C44.

The high-energy demodulation artifacts generated in response to analog TV synchronizing pulses, equalizing pulses, and color bursts are all suppressed when the NTSC-rejection comb filter A20 additively combines alternate video frames. Also, artifacts arising from the video content of the analog TV signal that does not change over two frames are suppressed, getting rid of stationary patterns irrespective of their spatial frequency or color. The co-channel interference detector A44 of FIG. 14 is used together with the FIG. 9 symbol decoding circuitry.

The remaining problem of suppressing demodulation artifacts primarily concerns suppressing those demodulation artifacts arising from frame-to-frame difference at certain pixel locations within the analog TV signal raster. These demodulation artifacts can be suppressed by intra-frame filtering techniques. The NTSC-rejection comb filter B20 and the ISI-suppression comb filter B26 circuitry can be chosen to suppress remnant demodulation artifacts by relying on correlation in the horizontal direction. The NTSC-rejection comb filter C20 and the ISI-suppression comb filter C26 circuitry can be chosen to suppress remnant demodulation artifacts by relying on correlation in the vertical direction. Consider how such a design decision can be further implemented.

Presume the sound carrier of a co-channel interfering analog TV signal is suppressed by SAW filtering or a sound trap in the IF amplifier chain 12. Then it is advantageous to choose the NTSC-rejection comb filter B20 and the ISI-suppression comb filter B26 circuitry to be of types like the NTSC-rejection comb filter 220 and the ISI-suppression comb filter 226 circuitry of FIG. 6. This is because the anti-correlation between video components only six symbol epochs away from each other is usually better than the correlation between video components twelve symbol epochs away from each other. The co-channel interference detector B44 of FIG. 17 is used together with the FIG. 6 symbol decoding circuitry.

The optimal choice of the NTSC-rejection comb filter C20 and the ISI-suppression comb filter C26 circuitry is less straightforward. A co-channel interfering NTSC signal is field interlaced. So, choice must be made as to whether the current scan line in the NTSC-rejection comb filter C20 is to be combined with the temporally closer scan line in the same field or with the spatially closer line in the preceding field. Choosing the temporally closer scan line in the same field is generally the better choice, since jump cuts between fields are less likely to ravage NTSC rejection by the comb filter C20. With such choice, the NTSC-rejection comb filter C20 and the ISI-suppression comb filter C26 circuitry are of types like the NTSC-rejection comb filter 320 and the ISI-suppression comb filter 326 circuitry of FIG. 7. The co-channel interference detector C44 of FIG. 12 is used together with the FIG. 7 symbol decoding circuitry.

With the other choice instead, the NTSC-rejection comb filter C20 and the ISI-suppression comb filter C26 circuitry are of types like the NTSC-rejection comb filter 420 and the ISI-suppression comb filter 426 circuitry of FIG. 8. The co-channel interference detector C44 of FIG. 13 is used together with the FIG. 8 symbol decoding circuitry.

FIG. 19 shows modification of the FIG. 18 DTV signal receiver in which the co-channel interference detectors A44, B44 and C44 detect the presence of artifacts of co-channel NTSC interference in the Q-channel baseband DTV signal, rather than artifacts in the I-channel baseband DTV signal. Detecting the presence of artifacts of co-channel NTSC interference in the I-channel baseband DTV signal, as done in the FIG. 18 DTV signal receiver, advantageously allows the co-channel interference detectors A44, B44 and C44 to share delay elements with the NTSC-rejection comb filters A20, B20 and C20.

One skilled in the art of DTV receiver design will be enabled by acquaintance with the foregoing disclosure to design other embodiments of the invention, and the claims which follow should be construed to include such embodiments of the invention within their scope. For example, forms of ISI-suppression filtering other than that specifically described may be used in embodiments of the invention. Another form of ISI-suppression filtering is disclosed by Citta and Sgrignoli in U.S. Pat. No. 5,087,975 issued Feb. 11, 1992 and entitled "VSB HDTV TRANSMISSION SYSTEM WITH REDUCED NTSC CO-CHANNEL INTERFERENCE".

What is claimed is:

1. A digital television signal receiver for digital television signals that are received as vestigial-sideband amplitude-modulation of a carrier and that are apt to be accompanied at times by co-channel interfering analog television signals of undesirable strengths, said digital television signal receiver including:
 amplifier circuitry for supplying an amplified vestigial-sideband amplitude-modulated digital television signal;
 demodulation circuitry responsive to said amplified vestigial-sideband amplitude-modulated digital television signal for supplying at least one baseband signal;
 symbol decoding apparatus for symbol decoding an I-channel baseband signal to generate symbol decoding results, said symbol decoding apparatus connected to receive said I-channel baseband signal as an input signal from said demodulation circuitry, said symbol decoding apparatus including
 a selectively operable filter for suppressing any artifacts of a co-channel interfering analog television signal accompanying said I-channel baseband signal to be symbol decoded, said filter being operable when and only when said symbol decoding apparatus receives a signal indicating there is a significant amount of co-channel NTSC interference;
 error correction circuitry for correcting errors in symbol decoding results from said symbol decoding apparatus;
 a co-channel interference detector connected to receive a further baseband input signal from said demodulation circuitry, said co-channel interference detector being of a type insensitive to the direct term of the system function of baseband signal it receives as its input signal and comprising:
 a first comb filter combining said further baseband input signal with itself as subjected to a first amount of differential delay to generate a first comb filter response, in which artifacts arising from synchronous detection of said co-channel interfering analog television signal are suppressed, and;
 a second comb filter combining said further baseband input signal with itself as subjected to a second amount of differential delay to generate a second comb filter response, in which the artifacts arising from synchronous detection of said co-channel interfering analog television signal are reinforced, and in which the direct term of system characteristic arising from synchronous detection of said carrier is similar to that in said first comb filter response;
 a first amplitude detector for detecting the amplitude of said first comb filter response to generate a first amplitude detection response;
 a second amplitude detector for detecting the amplitude of said second comb filter response to generate a second amplitude detection response; and
 an amplitude comparator for comparing said first and second amplitude detection responses and, when and only when said first and second amplitude detection responses differ by more than a prescribed amount, supplying said signal indicating there is said significant amount of co-channel NTSC interference.

2. The digital television signal receiver of claim 1, wherein said demodulation circuitry comprises:
 a complex demodulator responsive to said amplified vestigial-sideband amplitude-modulated digital television signal, for supplying I-channel baseband signal used in applying to said symbol decoding apparatus its said input signal, and for supplying Q-channel baseband signal containing further artifacts of any co-channel interfering analog television signal.

3. The digital television signal receiver of claim 2, wherein said Q-channel baseband signal from said complex demodulator is used in applying said further baseband signal to said co-channel interference detector as its input signal.

4. The digital television signal receiver of claim 2, wherein said I-channel baseband signal from said complex demodulator is used in applying said further baseband signal to said co-channel interference detector as its input signal.

5. The digital television signal receiver of claim 1, wherein said first comb filter is of a type for differentially combining said further baseband input signal with itself as subjected to said first amount of differential delay to generate said first comb filter response, and wherein said second comb filter is of a type for differentially combining said further baseband input signal with itself as subjected to said second amount of differential delay to generate said second comb filter response.

6. The digital television signal receiver of claim 5, wherein said second amount of differential delay is six symbol epochs.

7. The digital television signal receiver of claim 6, wherein said first amount of differential delay is twelve symbol epochs.

8. The digital television signal receiver of claim 6, wherein said first amount of differential delay is 1368 symbol epochs or the duration of two NTSC video scan lines.

9. The digital television signal receiver of claim 6, wherein said first amount of differential delay is 179,208 symbol epochs or the duration of 262 NTSC video scan lines.

10. The digital television signal receiver of claim 6, wherein said first amount of differential delay is 718,200 symbol epochs or the duration of two NTSC video frames.

11. The digital television signal receiver of claim 1, wherein said first comb filter is of a type for additively combining said further baseband input signal with itself as subjected to said first amount of differential delay to generate said first comb filter response, and wherein said second comb filter is of a type for additively combining said further baseband input signal with itself as subjected to said second amount of differential delay to generate said second comb filter response.

12. The digital television signal receiver of claim 11, wherein said first amount of differential delay is six symbol epochs.

13. The digital television signal receiver of claim 12, wherein said second amount of differential delay is twelve symbol epochs.

14. A digital television signal receiver for digital television signals that are received as vestigial-sideband amplitude-modulation of a carrier and that are apt to be accompanied at times by co-channel interfering analog television signals of undesirable strengths, said digital television signal receiver including:

amplifier circuitry for supplying an amplified vestigial-sideband amplitude-modulated digital television signal;

demodulation circuitry responsive to said amplified vestigial-sideband amplitude-modulated digital television signal for supplying at least one baseband signal;

symbol decoding apparatus connected to receive, as an input signal from said demodulation circuitry, an I-channel baseband signal containing artifacts of any co-channel interfering analog television signal;

a first data slicer included in said symbol decoding apparatus for symbol decoding said I-channel baseband signal during at least first times to generate first symbol decoding results;

a first comb filter included in said symbol decoding apparatus for combining said I-channel baseband signal with itself as subjected to a first amount of differential delay to generate a first comb filter response in which artifacts arising from synchronous detection of said co-channel interfering analog television signal are suppressed;

a second data slicer included in said symbol decoding apparatus for symbol decoding said first comb filter response during second times to generate second symbol decoding results;

a second comb filter included in said symbol decoding apparatus for combining selected symbol decoding results with final symbol decoding results as subjected to a second amount of delay to generate said final symbol decoding results, said selected symbol decoding results corresponding to said first symbol decoding results during first times and to said second symbol decoding results during second times, said first and second amounts of delay each being the same number of symbol epochs as the other;

error correction circuitry connected for correcting errors in final symbol decoding results, said error correction circuitry capable of correcting errors in said first symbol decoding results selected as said final symbol decoding results as long as artifacts of any co-channel interfering analog television signal are of less strength in said I-channel baseband signal than said undesirable strengths; and a co-channel interference detector connected to receive a further baseband input signal from said demodulation circuitry, said co-channel interference detector being of a type insensitive to the direct term of the system function of baseband signal it receives as its input signal and comprising:

a third comb filter combining said further baseband input signal with itself as subjected to a third amount of differential delay to generate a third comb filter response, in which artifacts arising from synchronous detection of said co-channel interfering analog television signal are suppressed;

a fourth comb filter combining said further baseband input signal with itself as subjected to a fourth amount of differential delay to generate a fourth comb filter response, in which the artifacts arising from synchronous detection of said co-channel interfering analog television signal are reinforced, and in which the direct term of system characteristic arising from synchronous detection of said carrier is similar to that in said first comb filter response;

a first amplitude detector for detecting the amplitude of said third comb filter response to generate a first amplitude detection response;

a second amplitude detector for detecting the amplitude of said fourth comb filter response to generate a second amplitude detection response; and an amplitude comparator for comparing said first and second amplitude detection responses and indicating, when and only when said first and second amplitude detection responses differ more than a prescribed amount, that co-channel interfering analog television signal in said I-channel baseband signal is of sufficient strength that said error correction circuitry would be incapable of consistently correcting errors in first symbol decoding results from said first data slicer, the resulting indication being supplied to said second comb filter as a command to select other than said first symbol decoding result as said final symbol decoding result.

15. The digital television signal receiver of claim 14, wherein said demodulation circuitry comprises a complex demodulator responsive to said amplified vestigial-sideband amplitude-modulated digital television signal, for supplying I-channel baseband signal used in applying to said symbol decoding apparatus its said input signal, and for supplying Q-channel baseband signal containing further artifacts of any co-channel interfering analog television signal.

16. The digital television signal receiver of claim 15, wherein said Q-channel baseband signal from said complex demodulator is used in applying said further baseband signal to said co-channel interference detector as its input signal.

17. The digital television signal receiver of claim 15, wherein said I-channel baseband signal from said complex demodulator is used in applying said further baseband signal to said co-channel interference detector as its input signal.

18. The digital television signal receiver of claim 14, wherein said second comb filter at prescribed third times selects an ideal symbol decoding result as said final symbol decoding result, wherein said second times occur at times other than said third times when said amplitude comparator supplies said second comb filter said command to select other than said first symbol decoding result as said final symbol decoding result, and wherein said first times occur at times other than said second and third times.

19. The digital television signal receiver of claim 14, wherein said third comb filter is of a type for differentially combining said further baseband input signal with itself as subjected to said third amount of differential delay to generate said third comb filter response, and wherein said fourth comb filter is of a type for differentially combining said further baseband input signal with itself as subjected to said fourth amount of differential delay to generate said fourth comb filter response.

20. The digital television signal receiver of claim 19, wherein said fourth amount of differential delay is six symbol epochs.

21. The digital television signal receiver of claim 20, wherein said first, second and third amounts of differential delay are each twelve symbol epochs.

22. The digital television signal receiver of claim 20, wherein said first, second and third amounts of differential delay are each 1368 symbol epochs or the duration of two NTSC video scan lines.

23. The digital television signal receiver of claim 20, wherein said first, second and third amounts of differential delay are each 179,208 symbol epochs or the duration of 262 NTSC video scan lines.

24. The digital television signal receiver of claim 20, wherein said first, second and third amounts of differential delay are each 718,200 symbol epochs or the duration of two NTSC video frames.

25. The digital television signal receiver of claim 14, wherein said third comb filter is of a type for additively combining said further baseband input signal with itself as subjected to said third amount of differential delay to generate said third comb filter response, and wherein said fourth comb filter is of a type for additively combining said further baseband input signal with itself as subjected to said fourth amount of differential delay to generate said fourth comb filter response.

26. The digital television signal receiver of claim 25, wherein said third amount of differential delay is six symbol epochs.

27. The digital television signal receiver of claim 26, wherein said fourth amount of differential delay is twelve symbol epochs.

28. The digital television signal receiver of claim 25, wherein said first, second, and third amounts of differential delay are each six symbol epochs.

* * * * *